US011762918B2

(12) United States Patent
Ura et al.

(10) Patent No.: US 11,762,918 B2
(45) Date of Patent: Sep. 19, 2023

(54) SEARCH METHOD AND APPARATUS

(71) Applicant: FUJITSU LIMITED, Kawasaki (JP)

(72) Inventors: Akira Ura, Yokohama (JP); Kenichi Kobayashi, Kawasaki (JP); Haruyasu Ueda, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 1341 days.

(21) Appl. No.: 16/166,203

(22) Filed: Oct. 22, 2018

(65) Prior Publication Data
US 2019/0122078 A1 Apr. 25, 2019

(30) Foreign Application Priority Data

Oct. 24, 2017 (JP) .................................. 2017-204868

(51) Int. Cl.
*G06N 20/00* (2019.01)
*G06F 16/906* (2019.01)
(Continued)

(52) U.S. Cl.
CPC .............. *G06F 16/906* (2019.01); *G06F 9/38* (2013.01); *G06F 9/5027* (2013.01); *G06F 16/00* (2019.01);
(Continued)

(58) Field of Classification Search
None
See application file for complete search history.

(56) References Cited

U.S. PATENT DOCUMENTS 10,318,346 B1 * 6/2019 Harizopoulos ......... G06F 3/061
2004/0158815 A1 * 8/2004 Potgieter ................ G06N 20/00
717/116

(Continued)

FOREIGN PATENT DOCUMENTS

CN 104125615 A * 10/2014 ............ H04W 28/24
CN 105554517 A * 5/2016
(Continued)

OTHER PUBLICATIONS

Akira Ura et al., "Hyperparameter Tuning of Machine Learning by Narrowing Search Regions with Subsampling", Workshop Date : Sep. 14, 2015-Sep. 15, 2015 / Issue Date : Sep. 7, 2015, Print edition: ISSN 0913-5685 Online edition: ISSN 2432-6380 (Year: 2015).*

(Continued)

*Primary Examiner* — Xuyang Xia
(74) *Attorney, Agent, or Firm* — Fujitsu Patent Center

(57) ABSTRACT

A search apparatus causes a first learning process using a first sample size and a first hyperparameter value to be executed, and causes a second learning process using the first sample size and a second hyperparameter value to be executed. When a third learning process using a second sample size larger than the first sample size and the first hyperparameter value has not been executed, the search apparatus calculates total resources associated with the first sample size based on resources used by the first and second learning processes. If the total resources exceed a threshold, the search apparatus allows the third learning process to be executed. If the total resources are equal to or less than the threshold, the search apparatus withholds the execution of the third learning process, and allows a fourth learning process using the first sample size or smaller and a third hyperparameter value to be executed.

7 Claims, 14 Drawing Sheets

(51) Int. Cl.
  *G06F 17/10* (2006.01)
  *G06F 9/50* (2006.01)
  *G06F 9/38* (2018.01)
  *G06F 16/00* (2019.01)
  *G06F 18/214* (2023.01)

(52) U.S. Cl.
  CPC .......... *G06F 17/10* (2013.01); *G06F 18/2148* (2023.01); *G06N 20/00* (2019.01)

(56) References Cited

U.S. PATENT DOCUMENTS

| | | |
|---|---|---|
| 2016/0292129 A1 | 10/2016 | Adams et al. |
| 2017/0061329 A1 | 3/2017 | Kobayashi et al. |

FOREIGN PATENT DOCUMENTS

| | | |
|---|---|---|
| JP | 2016-523402 | 8/2016 |
| JP | 2017-49674 | 3/2017 |
| JP | 2017-49677 | 3/2017 |
| WO | 2014/194161 | 12/2014 |

OTHER PUBLICATIONS

JPOA—Japanese Patent Office Action dated Jul. 6, 2021 for corresponding Japanese Application No. 2017-204868, with machine English translation.

Ura et al., "Hyperparameter tuning of machine learning by narrowing search regions with subsampling", IEICE Technical Report, The Institute of Electronics, Information and Communication Engineers, Sep. 2015, PRMU2015-74, with English Abstract. Cited in JPOA dated Jul. 6, 2021 for corresponding Japanese Application No. 2017-204868.

Lisha Li et al., "Hyperband: A Novel Bandit-Based Approach to Hyperparameter Optimization", arXiv:1603.06560v3, Nov. 23, 2016 (48 pages).

Jasper Snoek et al., "Practical Bayesian Optimization of Machine Learning Algorithms", In Advances in Neural Information Processing Systems 25 (NIPS 2012), Dec. 2012 (10 pages).

Frank Hutter et al., "Sequential Model-Based Optimization for General Algorithm Configuration", In Lecture Notes in Computer Science book series (LNCS, vol. 6683), LION 2011: Learning and Intelligent Optimization pp. 507-523, Jan. 2011 (17 pages).

James Bergstra et al., "Algorithms for Hyper-Parameter Optimization", In Advances in Neural Information Processing Systems 24 (NIPS 2011), Dec. 2011 (10 pages).

* cited by examiner

RESOURCE COEFFICIENT TABLE

| SAMPLE SIZE | 100 | 200 | 400 | 800 | 1600 |
|---|---|---|---|---|---|
| RESOURCE COEFFICIENT | 1 | 1 | 1 | 1 | 1 |
| TRIAL-COUNT RATIO VALUE | 16 | 8 | 4 | 2 | 1 |

131a

| SAMPLE SIZE | 100 | 200 | 400 | 800 | 1600 |
|---|---|---|---|---|---|
| RESOURCE COEFFICIENT | 1 | 2.25 | 3.92 | 6.42 | 11.42 |
| TRIAL-COUNT RATIO VALUE | 3.53 | 3.83 | 3.14 | 2.35 | 1.69 |

131

| SAMPLE SIZE | 100 | 200 | 400 | 800 | 1600 |
|---|---|---|---|---|---|
| RESOURCE COEFFICIENT | 1 | 2 | 4 | 8 | 16 |
| TRIAL-COUNT RATIO VALUE | 1 | 1 | 1 | 1 | 1 |

131b

SEARCH HISTORY TABLE

132

| HYPERPARAMETER VALUE | SAMPLE SIZE | PREDICTION PERFORMANCE | RUNTIME |
|---|---|---|---|
| $\theta_1$ | $s_1$ | $f(\theta_1, s_1)$ | $t(\theta_1, s_1)$ |
| $\theta_2$ | $s_1$ | $f(\theta_2, s_1)$ | $t(\theta_2, s_1)$ |
| $\theta_1$ | $s_2$ | $f(\theta_1, s_2)$ | $t(\theta_1, s_2)$ |
| ... | ... | ... | ... |

FIG. 9

SEARCH METHOD AND APPARATUS

CROSS-REFERENCE TO RELATED APPLICATION

This application is based upon and claims the benefit of priority of the prior Japanese Patent Application No. 2017-204868, filed on Oct. 24, 2017, the entire contents of which are incorporated herein by reference.

FIELD

The embodiments discussed herein are related to a search method and apparatus.

BACKGROUND

Machine learning is sometimes employed as a computer-based data analytics technique. In machine learning, training data indicating some known instances is fed into a computer. The computer analyzes the training data to thereby build a model that generalizes the relationship between cause (sometimes referred to as an explanatory or independent variable or variables) and effect (sometimes referred to as a target or dependent variable). The use of the model built allows predictions of the outcomes of unknown instances.

As for machine learning, it is preferable that the built model achieve high accuracy, that is, have a high ability to predict the outcomes of unknown instances (sometimes called prediction performance) with accuracy. The larger the size of training data (sample size) used in learning, the better the prediction performance. However, a larger sample size results in longer runtime for building a model.

Note also that in machine learning, the use of a different hyperparameter value leads to building a model with different prediction performance on the same training data. A hyperparameter is a setting used to control the behavior of machine learning. Unlike a model coefficient learned through machine learning, a hyperparameter value is fixed before a model is built. A hyperparameter includes an element indicating, for example, a machine learning algorithm such as logistic regression, Support Vector Machine (SVM), or Random Forest. In addition, a hyperparameter includes, for example, a regularization constant C and a kernel hyperparameter $\gamma$, which are variables for a machine learning algorithm called Radial Basis Function (RBF) kernel SVM.

It is often the case that a hyperparameter value that maximizes the prediction performance of a model on a training dataset is not known in advance. One reasonable approach to this is to use a computer to search for a hyperparameter value that would achieve high prediction performance.

For example, a machine learning apparatus has been proposed, which builds a predictive model on a training dataset of the same sample size using each of a plurality of hyperparameter values and then outputs a model with the best prediction performance amongst the built models. The machine learning apparatus selects a predetermined number of hyperparameter values to be tested randomly (random search) over a hyperparameter space, which is the range of possible hyperparameter values, or by grid search which selects evenly spaced points defined in the hyperparameter space. In addition, a machine learning system has been proposed, which selects a hyperparameter value to be tested next, using Bayesian optimization.

See, for example, Japanese Laid-open Patent Publication No. 2017-49677 and International Publication Pamphlet No. WO 2014194161.

The goal of a hyperparameter search is to find a hyperparameter value that achieves high prediction performance on a training dataset of a sufficiently large sample size (i.e., a training dataset including a sufficiently large number of data samples). On the other hand, it takes a significant amount of runtime to try building models for various hyperparameter values by using training datasets of a large sample size from the beginning, which is therefore not desirable. In view of the above, a method is considered, which builds models using training datasets of a small sample size and then narrows hyperparameter values to be tested based on the prediction performance of the models. In narrowing the hyperparameter values, the sample size is expanded in stages.

To implement the above-mentioned method, the problem is to determine the order of expanding the sample size for various hyperparameter values so as to achieve efficient narrowing of hyperparameter values to be tested.

For example, one strategy may be to give priority to testing as many hyperparameter values as possible with sufficiently small sample sizes. However, this strategy puts off testing with larger sample sizes, which therefore delays the improvement of prediction performance that could be obtained by expanding the sample size. Another strategy may be to temporarily select a small number of hyperparameter values and give priority to expanding the sample size for each of the selected hyperparameter values to a level sufficient to determine the growth in prediction performance. However, with this strategy, if the selected hyperparameter values yield relatively low prediction performance compared to other unselected hyperparameter values, the testing of the selected hyperparameter values with the expanded sample sizes turns to be wasted.

SUMMARY

According to one embodiment, there is provided a search method including: causing, by a processor, a first learning process and a second learning process to be executed, the first learning process building a model by using a training dataset of a first sample size and a first hyperparameter value, the second learning process building a model by using a training dataset of the first sample size and a second hyperparameter value; calculating, by the processor, total resources associated with the first sample size based on resources used by the first learning process and resources used by the second learning process when a third learning process has not yet been executed, the third learning process building a model by using a training dataset of a second sample size, which is larger than the first sample size, and the first hyperparameter value; allowing, by the processor, execution of the third learning process to progress when the total resources exceed a threshold; and withholding, by the processor, the execution of the third learning process and allowing execution of a fourth learning process to progress when the total resources are equal to or less than the threshold, the fourth learning process building a model by using a training dataset whose size is equal to or less than the first sample size and a third hyperparameter value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 illustrates an example of a search history table.

DESCRIPTION OF EMBODIMENTS

Figure 1:
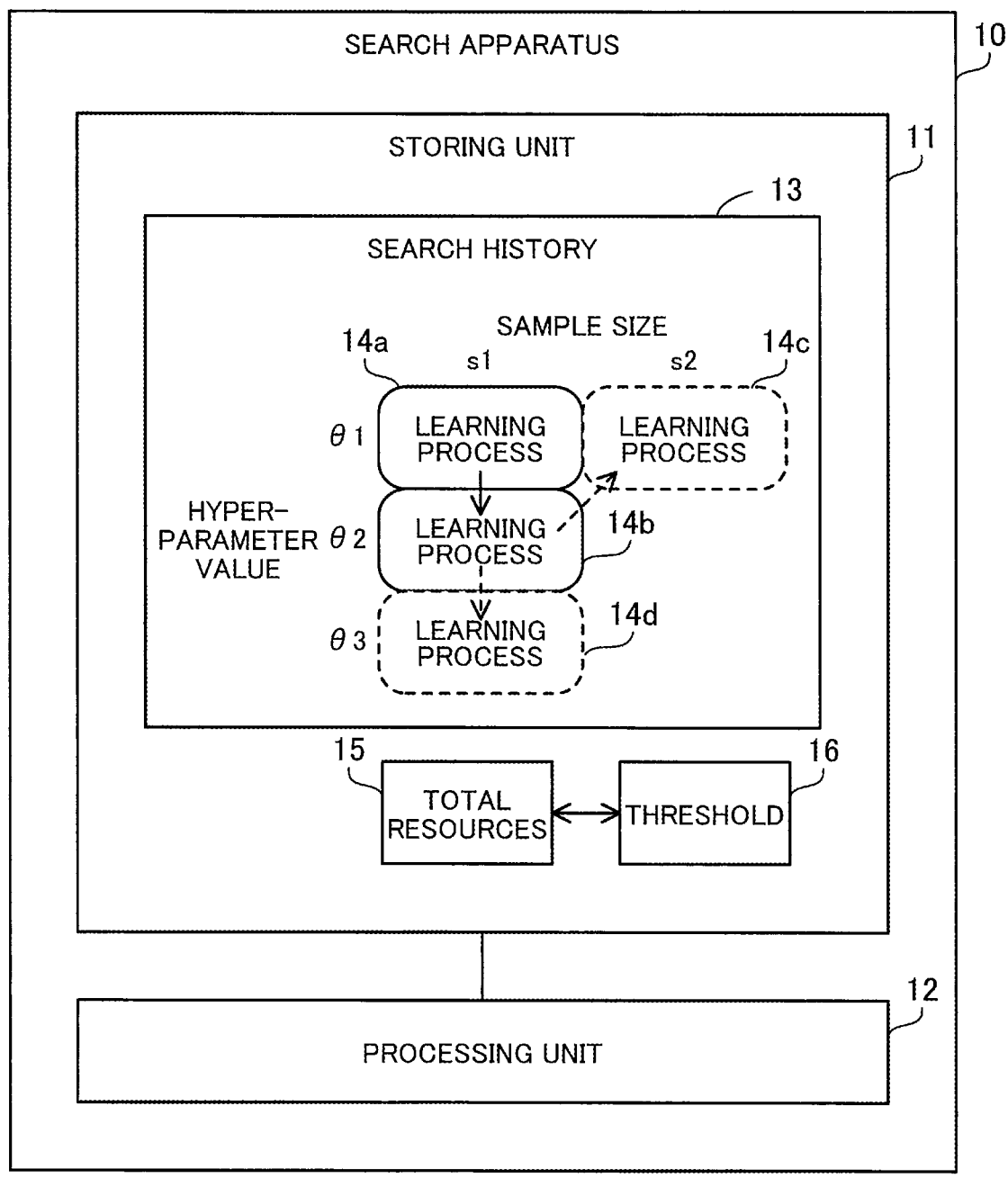
FIG. 1 illustrates a search apparatus.

Several embodiments will be described below with reference to the accompanying drawings, wherein like reference numerals refer to like elements throughout.

(a) First Embodiment

This part explains a first embodiment.
FIG. 1 illustrates a search apparatus.
A search apparatus 10 of the first embodiment manages the progress of a machine learning process. In the machine learning process, a training dataset representing some known instances is analyzed to build a model for predicting the outcomes of unknown instances (sometimes referred to as a learning model). The search apparatus 10 itself may perform machine learning, or may cause a different apparatus to perform machine learning. The search apparatus 10 may be a client computer operated by the user, or a server computer accessed from a client computer via a network.

The search apparatus 10 includes a storing unit 11 and a processing unit 12. The storing unit 11 may be volatile semiconductor memory such as random access memory (RAM), or a non-volatile storage device such as a hard disk drive (HDD) or flash memory. The processing unit 12 is, for example, a processor such as a central processing unit (CPU) or a digital signal processor (DSP). Note however that, the processing unit 12 may include an electronic circuit designed for specific use, such as an application specific integrated circuit (ASIC) or a field programmable gate array (FPGA). The processor executes programs stored in memory, such as RAM (for example, the storing unit 11).

The programs include a search program. The term "multi-processor", or simply "processor", may be used to refer to a set of multiple processors.

As for a model built by machine learning, the prediction performance of the model, which indicates the accuracy of predicting the outcomes of unknown instances, may be calculated using a testing dataset representing known instances. There are a variety of prediction performance measures and some commonly used ones are accuracy, precision, F-measure, mean squared error (MSE), and root mean squared error (RMSE), for example. In machine learning, it is preferable to build a model with high prediction performance. The prediction performance of the model built depends on a dataset (data population) used as a training dataset. In addition, the model's prediction performance also depends on a hyperparameter value, which is a setting used to control the behavior of machine learning.

Unlike a model coefficient included in a model, whose value is learned through machine learning, the value of a hyperparameter is fixed before the start of model building. A change in the hyperparameter value effects a change in a model to be built and therefore in prediction performance. A hyperparameter may include designation of a machine learning algorithm and designation of a method for preprocessing a training dataset. The search apparatus 10 searches for a suitable hyperparameter value for a dataset. The goal of a hyperparameter search is to find a hyperparameter value that achieves high prediction performance on a training dataset of a sufficiently large sample size. It is, however, not efficient to test various hyperparameter values by using training datasets of a large sample size from the beginning. In view of this, the search apparatus 10 starts testing with a small sample size and narrows hyperparameter values as the sample size is expanded in stages.

The storing unit 11 stores a search history 13. The search history 13 provides a history of learning processes, each for building a model by using a training dataset of a single sample size and a single hyperparameter value. The search history 13 indicates individual tested pairs of a sample size and a hyperparameter value. Referring to the example of FIG. 1, a learning process 14a for building a model by using a training dataset of a sample size s1 and a hyperparameter value θ1 has been performed. In addition, a learning process 14b using a training dataset of the sample size s1 and a hyperparameter value θ2 has been performed. On the other hand, a learning process 14c for building a model by using a training dataset of a sample size s2 and the hyperparameter value θ1 has yet to be performed. In addition, a learning process 14d using a training dataset of the sample size s1 or less and a hyperparameter value θ3 has yet to be performed.

The processing unit 12 selects a learning process to be performed next with reference to the search history 13 stored in the storing unit 11, and causes the search apparatus 10 or a different information processor to perform the selected learning process. The processing unit 12 has already caused the learning processes 14a and 14b to run but has yet to cause the learning processes 14c and 14d to run. In this case, the processing unit 12 calculates total resources 15 associated with the sample size s1, based on resources used by the learning process 14a and those used by the learning process 14b, and then compares the total resources 15 with a threshold 16.

Any indicator reflecting a load of a learning process may be used as the "resources" here. For example, as the resources, any of the following may be used: the size of a training dataset (sample size) used in the learning process; the runtime of the learning process; and the number of iterations of a machine learning algorithm in the learning process. The total resources 15 are the sum of, for example, resources of a plurality of learning processes having used training datasets of the sample size s1. The threshold 16 is determined, for example, according to the sample size s2. The processing unit 12 may calculate the threshold 16 based on resources estimated to be used in the learning process 14c. In addition, the processing unit 12 may calculate the threshold 16 using, amongst a plurality of resource coefficients individually set for each of a plurality of sample sizes in advance, a resource coefficient assigned to the sample size s2. The processing unit 12 may additionally use a resource coefficient assigned to the sample size s1 to calculate the threshold 16.

If the total resources 15 exceed the threshold 16, the processing unit 12 allows the learning process 14c to be executed. In this case, it is preferable that the learning process 14c be performed next in preference to the learning process 14d. That is, a priority is given to expanding the sample size of an already tested hyperparameter value. On the other hand, if the total resources 15 are equal to or less than the threshold 16, the processing unit 12 allows the learning process 14d to be performed while withholding the execution of the learning process 14c. In this case, it is preferable that the learning process 14d be performed next in preference to the learning process 14c. That is, a priority is given to increasing the number of tested hyperparameter values.

As seen from the above, the search apparatus 10 of the first embodiment calculates the total resources 15 from resources used in the learning processes 14a and 14b already executed with the sample size s1, and compares the total resources 15 with the threshold 16. If the total resources 15 exceed the threshold 16, the search apparatus 10 allows the execution of the learning process 14c using the sample size s2, which is larger than the sample size s1. If the total resources 15 are equal to or less than the threshold 16, the search apparatus 10 withholds the execution of the learning process 14c and allows the execution of the learning process 14d using the sample size s1 or less.

Herewith, in selecting a pair of a hyperparameter value and a sample size to be tested next, it is possible to incorporate a fine balance between increasing the number of tested hyperparameter values and expanding the sample size. This, in turn, reduces the risk of delaying the improvement of prediction performance, which is obtained by expanding the sample size, due to giving too much priority to testing with small sample sizes, as well as the risk of running fruitless testing due to giving too much priority to testing with large sample sizes. As a result, it is possible to provide a more efficient search for a hyperparameter value.

(b) Second Embodiment

This part explains a second embodiment.

Figure 2:
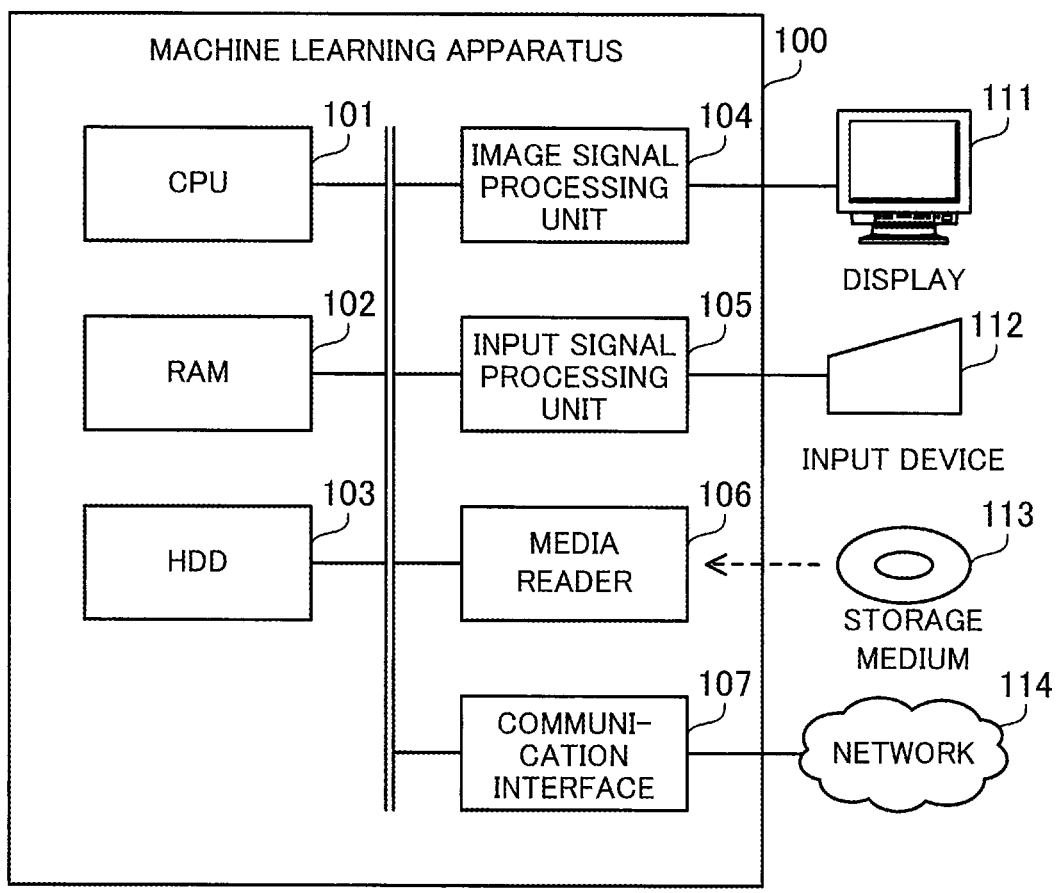
FIG. 2 is a block diagram illustrating an example of hardware of a machine learning apparatus.

FIG. 2 is a block diagram illustrating an example of hardware of a machine learning apparatus.

A machine learning apparatus 100 includes a CPU 101, a RAM 102, an HDD 103, an image signal processing unit 104, an input signal processing unit 105, a media reader 106, and a communication interface 107. These individual units are connected to a bus. The machine learning apparatus 100 corresponds to the search apparatus 10 of the first embodiment. The CPU 101 corresponds to the processing unit 12 of the first embodiment while the RAM 102 or the HDD 103 corresponds to the storing unit 11.

The CPU 101 is a processor configured to execute program instructions. The CPU 101 reads out at least part of programs and data stored in the HDD 103, loads them into the RAM 102, and executes the loaded programs. Note that the CPU 101 may include two or more processor cores and the machine learning apparatus 100 may include two or more processors, and processes to be described later may be executed in parallel using these processors or processor cores. The term "multiprocessor", or simply "processor", may be used to refer to a set of processors.

The RAM 102 is volatile semiconductor memory for temporarily storing therein programs to be executed by the CPU 101 and data to be used by the CPU 101 for its computation. Note that the machine learning apparatus 100 may be provided with a different type of memory other than RAM, or may be provided with two or more memory devices.

The HDD 103 is a non-volatile memory device to store therein software programs, such as an operating system (OS), middleware, and application software, and various types of data. The programs include a search program. Note that the machine learning apparatus 100 may be provided with a different type of memory device, such as flash memory or a solid state drive (SSD), or may be provided with two or more non-volatile memory devices.

The image signal processing unit 104 produces video images in accordance with drawing commands from the CPU 101 and displays them on a screen of a display 111 coupled to the machine learning apparatus 100. The display 111 may be any type of display, such as a cathode ray tube (CRT) display; a liquid crystal display (LCD); a plasma display panel (PDP); or an organic electro-luminescence (OEL) display.

The input signal processing unit 105 receives an input signal from an input device 112 connected to the machine learning apparatus 100 and supplies the input signal to the CPU 101. Various types of input devices may be used as the input device 112, for example, a pointing device, such as a mouse, a touch panel, a touch-pad, or a trackball; a keyboard; a remote controller; or a button switch. A plurality of types of input devices may be connected to the machine learning apparatus 100.

The media reader 106 is a reading device for reading out programs and data encoded on a storage medium 113. The storage medium 113 may be, for example, a magnetic disk, an optical disk, a magneto-optical disk (MO), or semiconductor memory. Examples of the magnetic disk are a flexible disk (FD) and an HDD. Examples of the optical disk are a compact disc (CD) and a digital versatile disc (DVD).

The media reader 106 copies the programs and data read out from the storage medium 113 to a different storage medium, for example, the RAM 102 or the HDD 103. The read programs are executed, for example, by the CPU 101. Note that the storage medium 113 may be a portable storage medium and used to distribute the programs and data. In addition, the storage medium 113 and the HDD 103 are sometimes referred to as computer-readable storage media.

The communication interface 107 is connected to a network 114 and communicates with other apparatuses via the network 114. The communication interface 107 is, for example, connected via a cable to a communication device, such as a switch or router.

Next described are a model to be built by machine learning and its prediction performance.

In machine learning according to the second embodiment, a dataset including a plurality of data units (also sometimes referred to as "records" or "instances") representing known outcomes (called "labels") is prepared in advance. The machine learning apparatus 100 or a different information processor may collect records via the network 114 from various devices such as sensor devices. The dataset may be data being large in size, so-called "big data". Each record includes one or more values of explanatory variables, also referred to as independent variables, and a value of a target variable, also referred to as a dependent or response variable. Explanatory and target variables are sometimes respectively referred to as attributes, and values of the explanatory and target variables are sometimes respectively referred to as attribute values.

The machine learning apparatus 100 samples a subset of records from the dataset as a training dataset, and builds a model using the training dataset. The model includes one or more explanatory variables, one or more model coefficients, and a target variable, and represents a causal relationship between the explanatory variables and the target variable. The model may be represented by a mathematical expression selected from various types, such as a linear equation, a polynomial of degree 2 or higher, an exponential function, and a logarithmic function. The type of the mathematical expression may be designated by the user prior to the commencement of machine learning. The model coefficients are determined through machine learning based on the training dataset. The use of the built model allows a prediction of a target variable value (effect) of an unknown instance from explanatory variable values (cause) of the unknown instance. The effect predicted by the model may be a continuous value, for example, a probability value between 0 and 1 inclusive, or a discrete value, for example, a binary value of YES or NO.

For the built model, its prediction performance is calculated. The prediction performance indicates the model's ability to accurately predict the effect of an unknown instance and thus may be referred to as the "degree of accuracy" of the model. The machine learning apparatus 100 samples, from the dataset, records other than the training dataset as a testing dataset and calculates the prediction performance using the testing dataset. The size of the testing dataset is, for example, about half the size of the training dataset. The machine learning apparatus 100 feeds explanatory variable values included in the testing dataset into the model, and then compares target variable values output from the model (predicted values) against target variable values included in the testing dataset (actual, or observed, values). Note that the process of examining the prediction performance of the built model may be referred to as "validation".

There are a variety of prediction performance measures and some commonly used ones are accuracy, precision, F-measure, MSE, and RMSE, for example. Suppose that the effect is represented by a binary value of YES or NO. Amongst N testing dataset instances, the number of instances with both the predicted and the actual values being YES is denoted by Tp, the number of instances with the predicted value being YES but the actual value being NO is denoted by Fp, the number of instances with the predicted value being NO but the actual value being YES is denoted by Fn, and the number of instances with both the predicted and the actual values being NO is denoted by Tn. In this case, accuracy is the rate of the entire correctly classified instances in the whole (N) testing dataset instances, and calculated as (Tp+Tn)/N. Precision is the rate of all positive predictions (i.e., YES) that are correct and calculated as Tp/(Tp+Fp). F-measure is calculated as (2×recall×precision)/(recall precision) where recall is calculated as Tp/(TP+Fn). MSE is calculated as $sum(y-y^*)^2/N$ and RMSE is calculated as $(sum(y-Y^*)^2/N)^{1/2}$ where y is the actual value of each of the instances and y* is the predicted value of the instance.

Next described is a learning step for model building.

Figure 3:
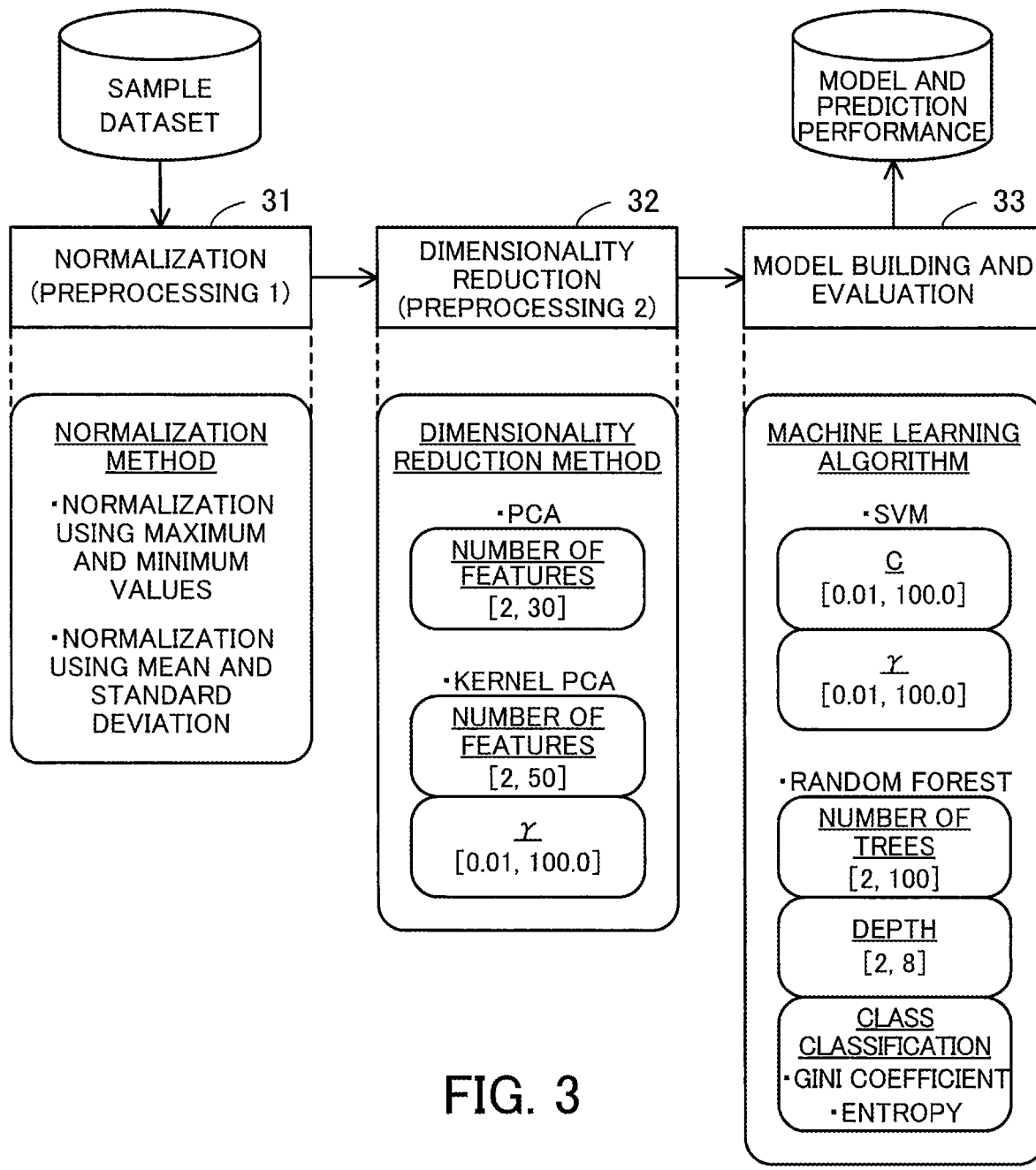
FIG. 3 illustrates an example of a pipeline for machine learning.

FIG. 3 illustrates an example of a pipeline for machine learning.

According to the second embodiment, one learning step for building a single model is defined as a sequence of processing tasks, called a "pipeline". The pipeline, which may also be called a workflow, is represented by a directed acyclic graph (DAG) with nodes corresponding to processing tasks and directed edges corresponding to data channels or dependencies between processing tasks. The input of the pipeline is an entire dataset, or a set of data sampled from the entire dataset. In either case, a dataset to be fed into the pipeline is hereinafter termed "sample dataset". The output of the pipeline is a model and its prediction performance. A processing task at the final stage of the pipeline is to build a model using a machine learning algorithm and measure the prediction performance of the model. Processing tasks other than that of the final stage are, for example, preprocessing operations on the sample dataset.

Here, a pipeline including tasks 31 to 33 is explained as an example.

The task 31 is a preprocessing operation at the first stage of the pipeline and designed to normalize values of records included in the sample dataset. The task receives the sample dataset and passes a set of the normalized records on to the task 32 as intermediate data produced at the first stage. The normalization is performed to map the values of the records into a predetermined range, to thereby reduce the impact of variation in scale of the values of each sample dataset (i.e., each sample dataset having different upper and/or lower limits) on the accuracy of machine learning.

The task 32 is a preprocessing operation at the second stage of the pipeline and designed to reduce the dimensionality (the number of explanatory variables) of the records included in the intermediate data obtained from the first stage. The task 32 receives the intermediate data of the first stage from the task 31, and passes a set of records with a reduced number of dimensions on to the task 33 as intermediate data produced at the second stage. The purpose of dimensionality reduction is to remove redundant explanatory variable values from the records so as to facilitate building a model with high prediction performance. The basic idea behind dimensionality reduction is that not all explanatory variables may have equally strong correlations with the target variable and be therefore useful for predicting values of the target variable.

The task 33 is an operation at the final stage of the pipeline and designed to build a model and evaluate prediction performance of the model. The task 33 receives the intermediate data of the second stage from the task 32 and outputs a model and its prediction performance. The model building and evaluation include extracting a subset of records included in the intermediate data of the second stage as a training dataset and building a model using the extracted training dataset and one machine learning algorithm. The model building and evaluation also include extracting other records of the intermediate data of the second stage as a testing dataset, predicting values of the target variable by feeding values of the explanatory variables included in the extracted testing dataset into the model, and measuring prediction performance of the model by comparing the predicted values with actual values.

The following is a description of hyperparameters that control the behavior of machine learning. Unlike a model coefficient included in a model, whose value is learned through machine learning, a hyperparameter value is fixed before the start of model building. A change in a hyperparameter value effects a change in a model to be built and therefore in prediction performance. Two types of hyperparameters are distinguished here: categorical and continuous.

Categorical hyperparameters take values from a fixed list of categories and there is no magnitude relationship between these values. A categorical hyperparameter is also referred to as a nominal scale. It is important to note that categorical hyperparameter values are really just names and bear no quantitative relationship to each other. There is therefore no point in comparing different categorical hyperparameter values or examining their difference and/or ratio. For this reason, the assumption that models built with similar hyperparameter values provide close prediction performance does not hold for categorical hyperparameters. Some categorical hyperparameters define preprocessing methods and machine learning algorithms. Other categorical hyperparameters define non-numeric variables used to control the behavior of machine learning algorithms.

Hyperparameters other than categorical hyperparameters are continuous hyperparameters whose values are taken from a defined continuous range of values, and there is a quantitative relationship between these values. A continuous hyperparameter may also be referred to as an ordinal, interval, or ratio scale. The ordinal type allows determination of a magnitude relationship between different continuous hyperparameter values but does not allow examination of their difference and/or ratio. The interval type allows examination of the difference (distance) between different continuous hyperparameter values but does not allow the ratio between them (interval scale). The ratio type allows examination of both the difference and ratio between different continuous hyperparameter values.

As for continuous hyperparameters, the assumption that models built with similar hyperparameter values provide close prediction performance is valid. Continuous hyperparameter values may be continuous values like real numbers, or discrete values like integers. Continuous hyperparameters include numerical variables used to control the behavior of preprocessing and those used to control the behavior of machine learning algorithms.

It is noted that hyperparameters may be vectors each listing a plurality of variables. For clarity purposes, such individual variables are hereinafter sometimes referred to as hyperparameter elements, and values assigned to the hyperparameter elements are sometimes referred to as hyperparameter element values. In addition, a set of hyperparameter elements is hereinafter sometimes referred to as a hyperparameter, and a set of hyperparameter element values is sometimes referred to as a hyperparameter value or point.

As mentioned above, a categorical hyperparameter may designate a machine learning algorithm. Machine learning algorithms supported by the machine learning apparatus 100 include, for example, logistic regression analysis, SVM, and Random Forest.

A logistic regression analysis is a regression analysis technique using an S-shaped or sigmoid curve to fit the relationship between values of a target variable y and values of explanatory variables $x_1, x_2, \ldots, x_k$. It is assumed that the target variable y and the explanatory variables $x_1, x_2, \ldots, x_k$ satisfy an equation of the form $\log(y/(1-y))=a_1x_1+a_2x_2+\ldots+a_kx_k+b$, where $a_1, a_2, \ldots, a_k$, and b are coefficients obtained by regression analysis.

An SVM is a machine learning algorithm for finding a boundary plane that best separates a set of records in N-dimensional space into two classes. The boundary plane is calculated in such a manner as to maximize the distance to the boundary (margin) for each of the classes.

A random forest is a machine learning algorithm that generates a model for classifying a plurality of records. In random forest, records are randomly extracted from a dataset. Then, some explanatory variables are randomly selected, and the extracted records are classified according to values of the selected explanatory variables. The selection of explanatory variables and the record classification are repeated to generate a hierarchical decision tree based on a plurality of explanatory variables. The record extraction and the decision tree generation are repeated to obtain a plurality of decision trees, which is then combined to produce a final model for record classification.

The pipeline including the above-described tasks 31 to 33 has various hyperparameter elements. The task 31 has a hyperparameter element that represents a normalization method. The normalization method is a categorical hyperparameter element, and has, as hyperparameter element values, a technique for projecting the minimum value to 0 and the maximum value to 1 (i.e., rescaling the range of values to scale the range in [0, 1]) and a technique for transforming values to have a mean of 0 and a standard deviation of 1 (Z-transform). The task has a hyperparameter element that represents a dimensionality reduction method. The dimensionality reduction method is a categorical hyperparameter element, and has, as hyperparameter element values, Principal Components Analysis (PCA) and Kernel PCA. The task 33 has a hyperparameter element representing a machine learning algorithm as a categorical hyperparameter element.

In the case of selecting PCA as the dimensionality reduction method, the task 32 further has a hyperparameter element that represents the number of features. The number of features is a continuous hyperparameter element, and takes an integer between 2 and 30, inclusive. In the case of selecting Kernel PCA, the task 32 further has hyperparameter elements individually representing the number of features and a variable $\gamma$. The number of features is a continuous hyperparameter element, and takes an integer between 2 and 50, inclusive. The variable $\gamma$ is a continuous hyperparameter element, and takes a real number between 0.01 and 100.0, inclusive.

In the case of selecting an SVM algorithm as the machine learning algorithm, the task 33 further has hyperparameter elements individually representing a variable C and a variable $\gamma$. The variable C is a continuous hyperparameter element, and takes a real number between 0.01 and 100.0, inclusive. The variable $\gamma$ is a continuous hyperparameter element, and takes a real number between 0.01 and 100.0, inclusive. In the case of selecting a Random Forest algorithm as the machine learning algorithm, the task 33 further has hyperparameter elements individually representing the number of trees, depth, and a class classification method. The number of trees is a continuous hyperparameter element, and takes an integer between 2 and 100, inclusive. The depth is a continuous hyperparameter element, and takes an integer between 2 and 8, inclusive. The class classification method is a categorical hyperparameter element, and has Gini coefficient and entropy as hyperparameter element values.

Figure 4:
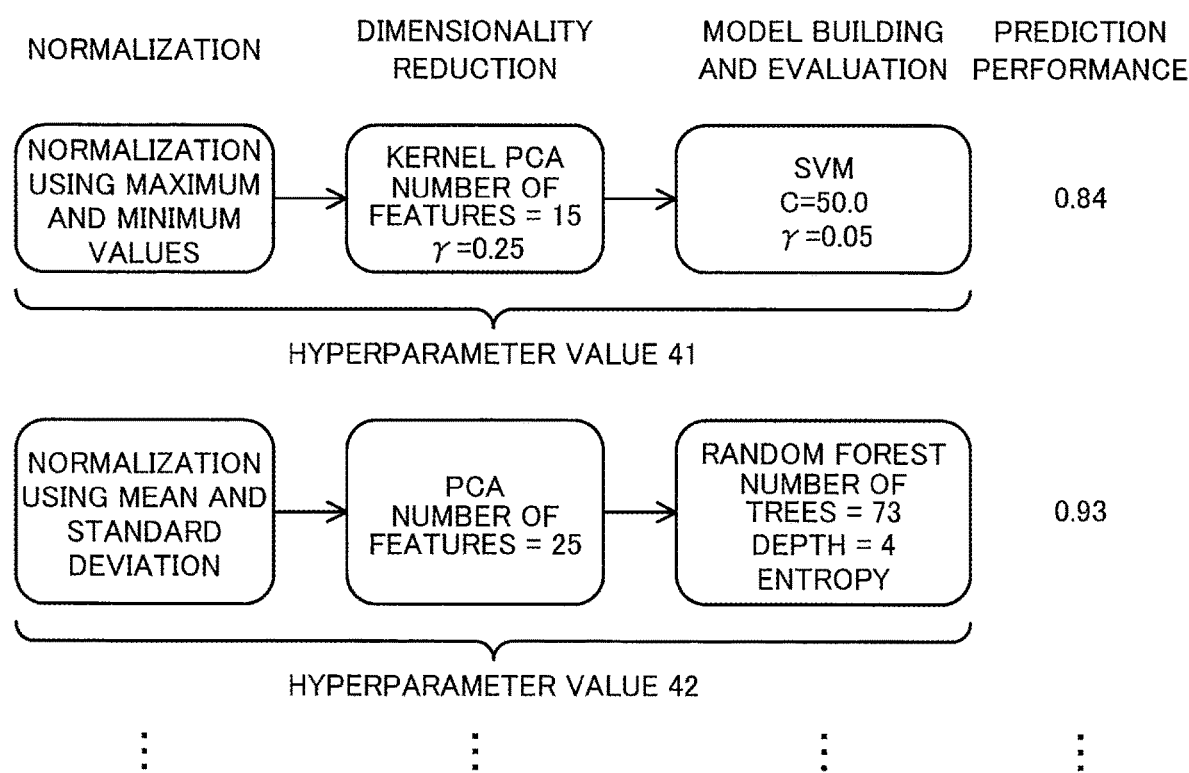
FIG. 4 illustrates an example of selections of hyperparameter values.

FIG. 4 illustrates an example of selections of hyperparameter values.

The machine learning apparatus 100 designates one hyperparameter value, that is, a set of hyperparameter element values, to thereby build a model and measure prediction performance of the model according to the pipeline of FIG. 3. A change in a hyperparameter value effects a change in a model to be built and therefore in prediction performance.

For example, the machine learning apparatus 100 performs a single learning step with designation of a hyperparameter value 41. The hyperparameter value 41 sets the normalization method to the technique for normalization using the maximum and minimum values. In addition, the hyperparameter value 41 sets the dimensionality reduction method to Kernel PCA, and then sets the number of features to 15 and the variable γ to 0.25. The hyperparameter value 41 also sets the machine learning algorithm to SVM, and then sets the variable C to 50.0 and the variable γ to 0.05. Using a sample dataset and the hyperparameter value 41, a model yielding a prediction performance of 0.84, for example, is built.

Looking at another example, the machine learning apparatus 100 performs a single learning step with designation of a hyperparameter value 42. The hyperparameter value 42 sets the normalization method to the technique for normalization using the mean and standard deviation. In addition, the hyperparameter value sets the dimensionality reduction method to PCA, and then sets the number of features to 25. The hyperparameter value 42 also sets the machine learning algorithm to Random Forest, and then sets the number of trees to 73, the depth to 4, and the class classification method to entropy. Using a sample dataset and the hyperparameter value 42, a model yielding a prediction performance of 0.93, for example, is built.

Next described is the sample size, which is the size of a training dataset used. As mentioned above, different hyperparameter values result in models with different prediction performance; however, the prediction performance of models also depends on the sample size. In the case of using the same hyperparameter value, a larger sample size often leads to building a model with higher prediction performance.

Figure 5:
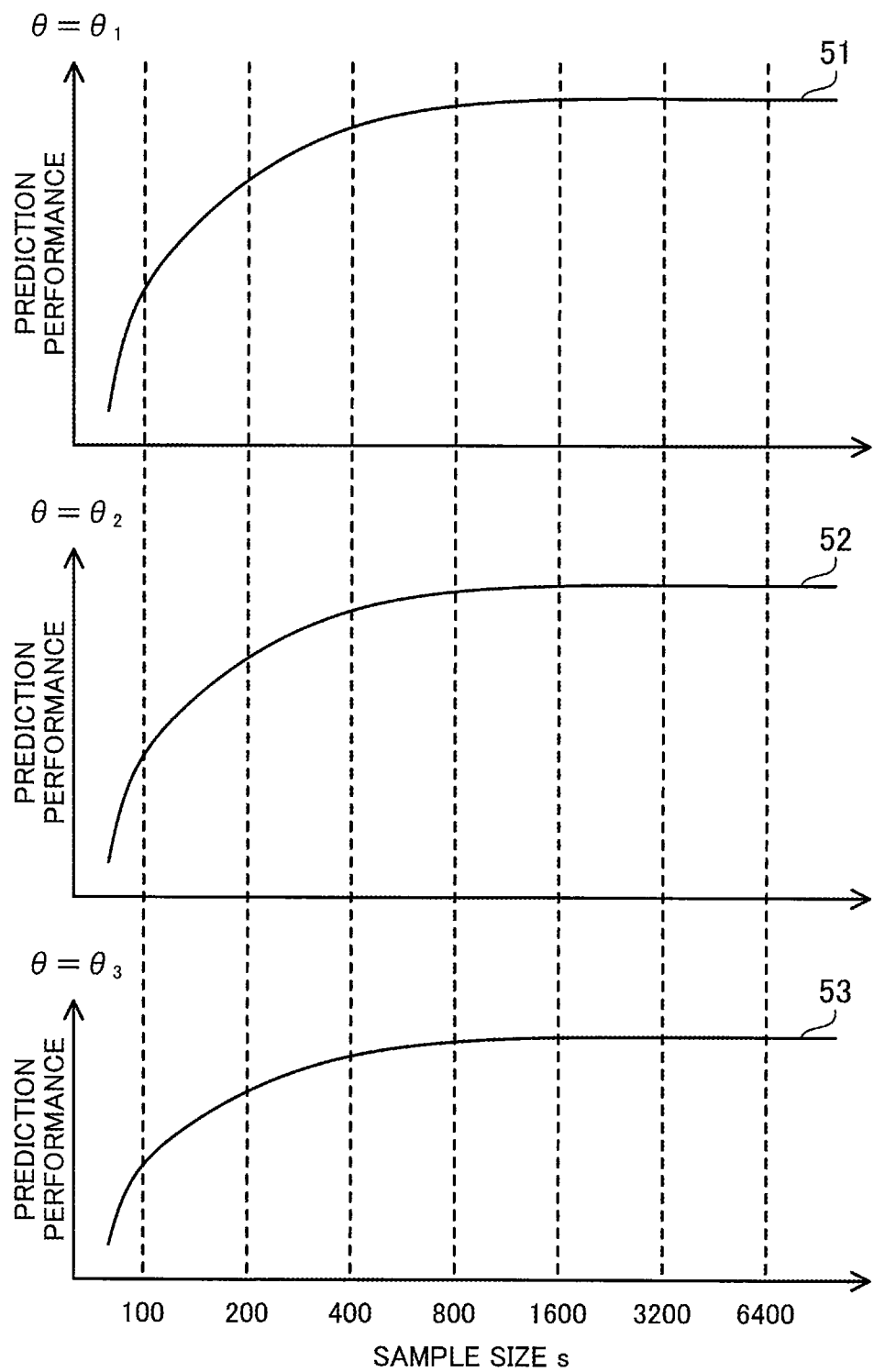
FIG. 5 is a graph illustrating exemplary relationships between sample size and prediction performance.

FIG. 5 is a graph illustrating exemplary relationships between sample size and prediction performance.

A curve 51 represents the relationship between sample size s and the prediction performance when a hyperparameter θ has a value of $θ_1$. A curve 52 represents the relationship between the sample size s and the prediction performance when the hyperparameter θ has a value of $θ_2$. A curve 53 represents the relationship between the sample size s and the prediction performance when the hyperparameter θ has a value of $θ_3$. The sample size s is the number of records included in a training dataset, and is exponentially expanded by a predetermined factor, for example, to 100, 200, 400, 800, and so on. The predetermined factor is two or four, for example.

As illustrated by the curves 51 to 53, for each of the hyperparameter values, higher prediction performance is achieved with a larger sample size. When the prediction performance remains low, the prediction performance rises rapidly as the sample size expands. On the other hand, there is an upper limit on the prediction performance, and the ratio of the increase in the prediction performance to the increase in the sample size starts to gradually decrease as the prediction performance comes close to the upper limit. In addition, it is noted that a larger sample size takes more runtime for building a model.

Different hyperparameter values have different upper limits for prediction performance. In the example of FIG. 5, a higher upper limit for prediction performance is observed in $θ=θ_2$ than in $θ=θ_3$, and an even higher upper limit is observed in $θ=θ_1$ than in $θ=θ_2$. Note however that, even with the same hyperparameter value, the rising contour of prediction performance changes depending on attributes (type) of a dataset used. For these reasons, it is not an easy task to identify a hyperparameter value that would provide the maximum prediction performance, before the start of machine learning. In view of this problem, the machine learning apparatus 100 according to the second embodiment is configured to search for a hyperparameter value that maximizes the upper limit for prediction performance over a dataset.

Figure 6:
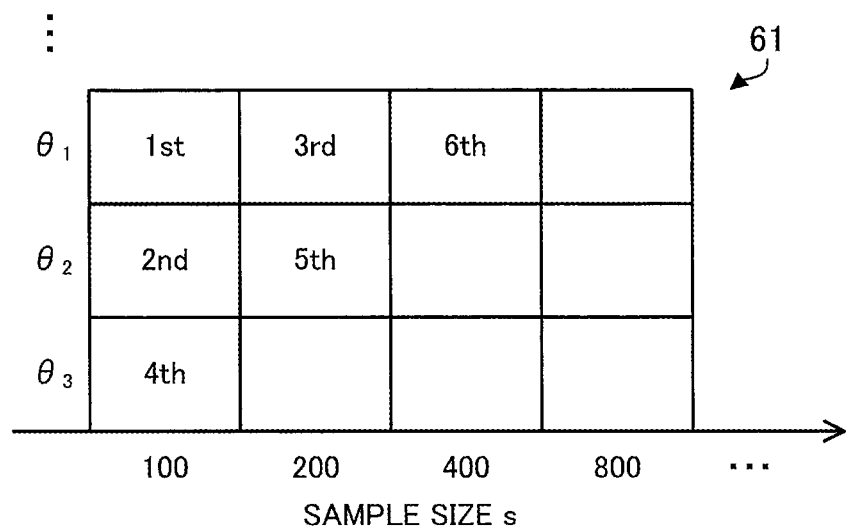
FIG. 6 illustrates an exemplary progression of a hyperparameter search.

FIG. 6 illustrates an exemplary progression of a hyperparameter search.

An end goal of a hyperparameter search is to find a hyperparameter value with a high upper limit for prediction performance over a training dataset of a sufficiently large sample size. On the other hand, it takes a significant amount of runtime to perform learning steps for various hyperparameter values by using training datasets of a large sample size from the beginning and is thus impractical. In addition, in the case where a plurality of categorical hyperparameter elements is included in a hyperparameter, there is no guarantee that models built using similar hyperparameter values will offer similar prediction performance.

In view of the above, the machine learning apparatus 100 tests out various hyperparameters on training datasets of a small sample size to measure the prediction performance of each resultant model, and estimates prediction performance of the model on a large sample size based on the measured prediction performance. The machine learning apparatus 100 selects hyperparameter values whose increase in prediction performance is expected to be relatively large compared to other hyperparameter values, and then increases the sample size for the selected hyperparameter values. The machine learning apparatus 100 expands the sample size in multiple stages.

In this regard, the problem is to determine the order of expanding the sample size for various hyperparameter values so as to enable an efficient hyperparameter search.

One simple strategy may be to give priority to testing as many hyperparameter values as possible with small sample sizes. However, because an increased sample size often results in improved prediction performance, delay in testing with larger sample sizes hinders the improvement of the prediction performance that otherwise would be obtained earlier. In this case, testing first with a relatively large sample size for some hyperparameter values may lead to efficient narrowing of hyperparameter values.

Another simple strategy may be to temporarily select a small number of hyperparameter values and give priority to expanding the sample size for each of the selected hyperparameter values until the rising contour of the prediction performance is determined. However, the selected hyperparameter values may have lower upper limits for prediction performance compared to other unselected hyperparameter values. If this is the case, the testing with the increased sample sizes will turn to be wasted. In this case, if several other hyperparameter values had also been tested first, the testing of the temporarily selected hyperparameter values might have been terminated halfway.

In light of the above considerations, the machine learning apparatus 100 is configured to select a hyperparameter value to be tested next with a sample size increased by one size increment in such a manner as to maintain a predetermined degree of balance between the amount tested with small sample sizes and the amount tested with large sample sizes for various hyperparameter values. Herewith, it is possible to prevent failure in narrowing hyperparameter values due to giving too much priority to testing with small sample sizes and also prevent failure in termination of testing due to giving too much priority to testing with large sample sizes.

The machine learning apparatus 100 uses a total amount of consumed resources as an indicator for the amount tested for hyperparameter values. The term "resources" refers to a load of one learning step with designation of a single hyperparameter value and a single sample size. One example of the resources is the sample size, that is, the number of records included in a training dataset used. Another example of the resources is the runtime, that is, the time needed to build a model from a training dataset and measure prediction performance of the model on a testing dataset. Yet another example of the resources is the number of iterations in the case where a machine learning algorithm used includes repetitive processing and a model with higher prediction performance is built by increasing the repetition (i.e., the number of iterations). Assume in the following the case of using the sample size as the resources.

When the total resources consumed by testing with a small sample size for a plurality of hyperparameter values (total amount of consumed resources) have exceeded a threshold, the machine learning apparatus 100 gives priority to testing of one of the hyperparameter values with a larger sample size. On the other hand, when the total amount of consumed resources is equal to or less than the threshold, the machine learning apparatus 100 gives priority to testing of a different hyperparameter value with the small sample size. Thus, whether to give priority to expanding the sample size for a hyperparameter value already tested or testing a new hyperparameter value is selected based on the total amount of consumed resources.

How to determine whether to allow or not testing of a given hyperparameter value with a given sample size (target sample size) is described here. The machine learning apparatus 100 selects one sample size smaller than the target sample size (comparative sample size). The machine learning apparatus 100 calculates the total amount of consumed resources of the selected comparative sample size, which is obtained by adding together resources consumed for hyperparameter values already tested with the selected comparative sample size. The machine learning apparatus 100 also calculates a threshold according to the target sample size. The threshold depends on the total amount of consumed resources associated with the target sample size, a resource coefficient of the comparative sample size, and a resource coefficient of the target sample size.

The total amount of consumed resources associated with the target sample size is obtained by adding, to resources consumed for hyperparameter values already tested with the target sample size, the amount of resources estimated to be consumed when the above testing of the hyperparameter value is allowed to progress. Therefore, the calculated total amount of consumed resources associated with the target sample size is an estimated total amount of resources to be consumed after the testing is allowed to progress. Each resource coefficient is used to adjust the slope of the total amount of consumed resources between a small sample size and a large sample size, and assigned in advance to a corresponding one of a plurality of sample sizes.

The threshold is adjusted by the ratio between the resource coefficient of the comparative sample size and that of the target sample size. For example, if the total amount of consumed resources associated with the target sample size is denoted by $r(s_i)$, the resource coefficient of the comparative sample size is denoted by $q(s_j)$, and the resource coefficient of the target sample size is denoted by $q(s_i)$, the threshold is calculated as: $r(s_i) \times q(s)/q(s_i)$. If the total amount of consumed resources associated with the comparative sample size is denoted by $r(s_j)$, the testing with the target sample size is allowed when $r(s_j) > r(s_i) \times q(s)/q(s_i)$ is true. On the other hand, the testing with the target sample size is rejected when $r(s_j) \leq r(s_i) \times q(s_j)/q(s_i)$ is true.

Suppose, for example, the case where the hyperparameter value $\theta = (\theta_1, \theta_2, \theta_3)$ and the sample size $s = (100, 200, 400)$. Also suppose that the resource coefficient of the sample size $s=100$ is 1, and the resource coefficient of the sample size $s=200$ is 1.4. In this case, learning steps are sequenced, for example, as illustrated by a graph 61 in FIG. 6.

First, a learning step with $\theta=\theta_1$ and $s=100$ is performed. At this point, the total amount of consumed resources associated with $s=100$ is 100. On the other hand, the total amount of consumed resources associated with $s=200$ is 200 if a learning step with $\theta=\theta_1$ and $s=200$ is performed. Thus, because $100 \leq 200 \times 1/1.4$ $(=143)$, the execution of the learning step with $\theta=\theta_1$ and $s=200$ is rejected.

In turn, a learning step with $\theta=\theta_2$ and $s=100$ is performed as the second learning step. At this point, the total amount of consumed resources associated with $s=100$ is 200. On the other hand, the total amount of consumed resources associated with $s=200$ is 200 if the learning step with $\theta=\theta_1$ and $s=200$ is performed. Thus, because $200>200 \times 1/1.4$ $(=143)$, the execution of the learning step with $\theta=\theta_1$ and $s=200$ is allowed.

Subsequently, the learning step with $\theta=\theta_1$ and $s=200$ is performed as the third learning step. In a similar fashion as above, the execution of a learning step with $\theta=\theta_1$ and $s=400$ is rejected. At this point, the total amount of consumed resources associated with $s=100$ is 200. On the other hand, the total amount of consumed resources associated with $s=200$ is 400 if a learning step with $\theta=\theta_2$ and $s=200$ is performed. Thus, because $200 \leq 400 \times 1/1.4$ $(=286)$, the execution of the learning step with $\theta=\theta_2$ and $s=200$ is also rejected.

In turn, a leading step with $\theta=\theta_2$ and $s=100$ is performed as the fourth learning step. At this point, the total amount of consumed resources associated with $s=100$ is 300. On the other hand, the total amount of consumed resources associated with $s=200$ is 400 if the learning step with $\theta=\theta_2$ and $s=200$ is performed. Thus, because $300>400 \times 1/1.4$ $(=286)$, the execution of the learning step with $\theta=\theta_2$ and $s=200$ is allowed. Therefore, the learning step with $\theta=\theta_2$ and $s=200$ is performed as the fifth learning step. Subsequently, a learning step with $\theta=\theta_1$ and $s=400$ is allowed and then performed as the sixth learning step.

As this example illustrates, the scheme of narrowing hyperparameter values in stages is maintained during the progress of the learning steps, starting with a small sample size and gradually increasing its size. Hence, the learning steps proceed while incorporating a fine balance between expanding the largest tested sample size and increasing the number of tested hyperparameter values.

Note that, in the case where there is a plurality of sample sizes smaller than the target sample size, the second embodiment designates all of the smaller sample sizes as comparative sample sizes. As for all of the comparative sample sizes, if the total amount of consumed resources associated with each of the comparative sample sizes exceeds the threshold, the testing with the target sample size is allowed. On the other hand, if the total amount of consumed resources of at least one of the comparative sample sizes is equal to or less than the threshold, the testing with the target sample size is rejected.

Alternatively, only some of the sample sizes smaller than the target sample size may be designated as comparative sample sizes. For example, only a sample size smaller than the target sample size by one size increment may be used as a comparative sample size. Still alternatively, a predetermined number of sample sizes in ascending order, e.g., s=100, 200, 400, may be excluded from comparative sample sizes. It is sometimes the case that, for a hyperparameter value to be newly tested, testing with a predetermined number of sample sizes in ascending order is performed in succession. This is because the prediction performance measurement is less accurate when the sample size remains sufficiently small and it is therefore difficult to estimate the rising contour of the prediction performance. The successive testing with a predetermined number of sample sizes in ascending order is sometimes called "warm-up" and performed all at once as a single learning step. In that case, the last sample size of the warm-up period may be used as a comparative sample size while excluding other smaller sample sizes used in the warm-up period.

The second embodiment compares the total amount of consumed resources associated with a single comparative sample size against a threshold defined according to a target sample size. Alternatively, the total amounts of consumed resources individually associated with a plurality of comparative sample sizes may be summed to form a combined value, which is then used in the comparison against the threshold according to the target sample size. For example, the total amounts of consumed resources individually associated with all sample sizes smaller than the target sample size may be summed to form a combined value, which is then compared to the threshold according to the target sample size. In this case, it is preferable that the resource coefficients of individual sample sizes used in calculating their corresponding thresholds be configured appropriately for comparison against combined values.

Next described are preferable resource coefficients.

Figure 7:
FIG. 7 illustrates examples of resource coefficient tables.
Figure 7:

FIG. 7 illustrates examples of resource coefficient tables.

The following first explains resource coefficient tables 131a and 131b representing simple resource coefficient setting techniques, which is then followed by an explanation of a resource coefficient table 131 representing a desirable resource coefficient setting technique. The resource coefficient tables 131, 131a, and 131b have the same structure, where a plurality of sample sizes and a plurality of resource coefficients are mapped to each other. In the example of FIG. 7, each of the resource coefficient tables 131, 131a, and 131b includes trial-count ratio values individually corresponding to the sample sizes. Each trial-count ratio value represents the number of hyperparameter values tested with the corresponding sample size. Note however that these trial-count ratio values are information given to facilitate understanding of what resource coefficients mean, and do not therefore have to be included in a resource coefficient table used by the machine learning apparatus 100.

In the resource coefficient table 131a, the resource coefficients for all the sample sizes are set to a single value of 1. That is, the resource coefficients, forming a ratio of 1:1:1:1:1, are associated with the sample sizes s=100, 200, 400, 800, 1600. In this case, the trial-count ratio corresponding to the sample sizes s=100, 200, 400, 800, 1600 is 16:8:4:2:1. Therefore, the setting technique of the resource coefficient table 131a is to allow, for every two trials with a given sample size, one trial with a sample size increased from the given sample size by one size increment. When the multiplication factor of the sample sizes is n, a reduction factor of the trial counts is 1/n. Thus, the setting technique of the resource coefficient table 131a places emphasis on testing with smaller sample sizes.

In the resource coefficient table 131b, the resource coefficients are set to have the same ratio as the sample sizes. That is, the resource coefficients, forming a ratio of 1:2:4:8:16, are associated with the sample sizes s=100, 200, 400, 800, 1600. In this case, the trial-count ratio corresponding to the sample sizes s=100, 200, 400, 800, 1600 is 1:1:1:1:1. Therefore, the setting technique of the resource coefficient table 131b is to allow, upon selection of one hyperparameter value, the sample size for the selected hyperparameter value to be increased in succession. Thus, a restriction on the sample size according to the total amount of consumed resources (resource constraint) does not practically work. The setting technique of the resource coefficient table 131b indicates the upper limit on the ratio represented by the resource coefficients.

In the resource coefficient table 131, each of the resource coefficients, forming a ratio of 1:2.25:3.92:6.42:11.42, is set to fall between the values of its counterparts in the resource coefficient tables 131a and 131b (except for s=200). How to calculate the resource coefficients of the resource coefficient table 131 is found in the following literature: Lisha Li et al., "Hyperband: A Novel Bandit-based Approach to Hyperparameter Optimization", arXiv: 1603.06560v3, Nov. 23, 2016.

When there are N sample sizes, this method calculates the resource coefficient of the $m^{th}$ sample size in ascending order by: N/N+N/(N−1)+ . . . +N/(N−m+1). Let N=5, the resource coefficient of s=100 is 5/5=1; the resource coefficient of s=200 is 5/5+5/4=2.25; the resource coefficient of s=400 is 5/5+5/4+5/3=3.92; the resource coefficient of s=800 is 5/5+5/4+5/3+5/2=6.42; and the resource coefficient of s=1600 is 5/5+5/4+5/3+5/2+5/1=11.42. In this case, the trial-count ratio corresponding to the sample sizes s=100, 200, 400, 800, 1600 is 3.53:3.83:3.14:2.35:1.69.

Next described are functions of the machine learning apparatus 100.

Figure 8:
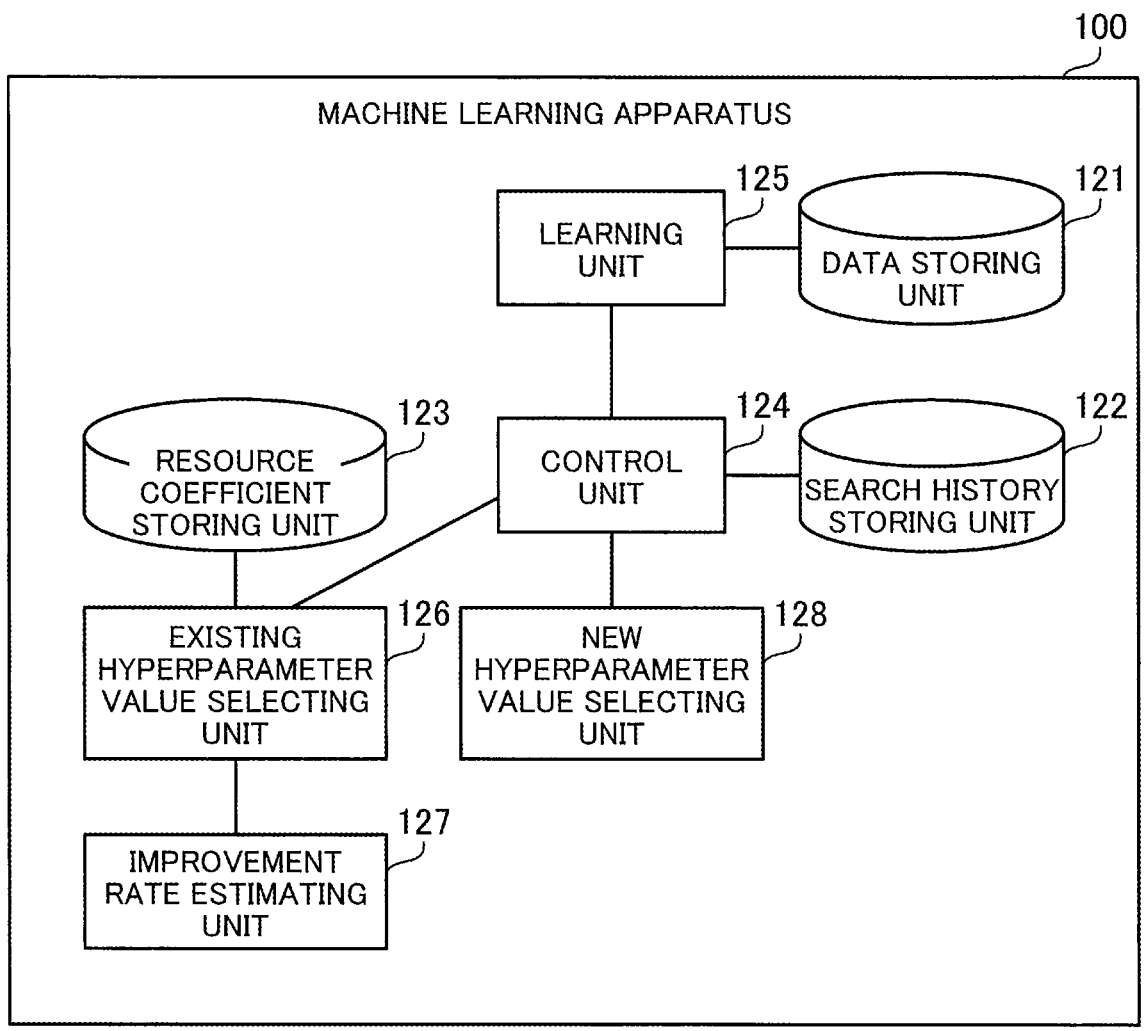
FIG. 8 is a block diagram illustrating an example of functions provided in the machine learning apparatus.

FIG. 8 is a block diagram illustrating an example of functions provided in the machine learning apparatus.

The machine learning apparatus 100 includes a data storing unit 121, a search history storing unit 122, and a resource coefficient storing unit 123. The machine learning apparatus 100 also includes a control unit 124, a learning unit 125, an existing hyperparameter value selecting unit 126, an improvement rate estimating unit 127, and a new hyperparameter value selecting unit 128. The data storing unit 121, the search history storing unit 122, and the resource coefficient storing unit 123 are implemented using a storage area secured, for example, in the RAM 102 or the HDD 103. The control unit 124, the learning unit 125, the existing hyperparameter value selecting unit 126, the improvement rate estimating unit 127, and the new hyperparameter value selecting unit 128 are implemented, for example, using programs executed by the CPU 101.

The data storing unit 121 stores therein a dataset which is a population of records available for use in machine learning. The dataset is a collection of records each including a target variable value and one or more explanatory variable values. Data stored in the data storing unit 121 may be originally collected by the machine learning apparatus 100 or different information processors from various types of devices, or input by the user to the machine learning apparatus 100 or different information processors.

The search history storing unit 122 stores therein a search history representing the development of a hyperparameter search in progress, run on a dataset stored in the data storing unit 121. The search history associates, for each pair of a tested hyperparameter value and sample size, measured prediction performance (actual or observed prediction performance) and a measured runtime (an actual or observed runtime) with each other. The resource coefficient storing unit 123 stores therein the above-mentioned resource coefficient table 131. The resource coefficient table 131 is provided, for example, by the user before the start of a hyperparameter search.

The control unit 124 controls machine learning. At the start of machine learning, the control unit 124 receives designation of a dataset, a hyperparameter search range, and a time limit. The dataset is stored in the data storing unit 121. The hyperparameter search range indicates hyperparameter elements included in each hyperparameter and possible values that each of the hyperparameter elements may take, and thus defines a multidimensional hyperparameter space. After the designated time limit has elapsed since the start of a machine learning session on the designated dataset, the control unit 124 forcibly terminates the machine learning session.

In the machine learning session, a search is performed for a hyperparameter value suitable for the designated dataset. The control unit 124 determines a hyperparameter value to be tested next with the aid of the existing hyperparameter value selecting unit 126 and the new hyperparameter value selecting unit 128, and then identifies a sample size to be tested next for the hyperparameter value. The control unit 124 designates the hyperparameter value and the sample size to the learning unit 125 to thereby cause the learning unit 125 to perform a single learning step. The control unit 124 acquires, from the learning unit 125, a built model, measured prediction performance of the model, and measured runtime of the learning step, and records the acquired prediction performance and runtime in a search history stored in the search history storing unit 122.

The control unit 124 repeats the above-described procedure until the length of time that has elapsed since the start of the machine learning session exceeds the time limit. If the elapsed time has exceeded the time limit, the control unit 124 outputs, amongst models built up to that point, a model with the best prediction performance. Together with the model, the control unit 124 also outputs a hyperparameter value used to build the model and the prediction performance of the model. The output information may be stored in the HDD 103 of the machine learning apparatus 100. In addition, the output information may be output from an output device of the machine learning apparatus 100. For example, the display 111 may be used to present the output information thereon. Further, the output information may be transmitted to a different information processor via the network 114.

The learning unit 125 receives designation of a hyperparameter value and a sample size from the control unit 124, and performs a single learning step using a dataset stored in the data storing unit 121. In the usual case, the learning unit 125 receives designation of one hyperparameter value and one sample size at one time. Note however that, during the warm-up period, the learning unit 125 may receive designation of multiple sample sizes at one time. If this is the case, the learning unit 125 performs testing of a designated hyperparameter value with the sample sizes in succession.

In a single learning step, the learning unit 125 extracts, as a training dataset, the number of records corresponding to the designated sample size (e.g., a hundred records in the case of s=100) from the dataset. The learning unit 125 also extracts, as a testing dataset, an adequate number of records according to the sample size (e.g., corresponding to one-half of the sample size) from the dataset. The training dataset and testing dataset are extracted, for example, in a random manner.

The learning unit 125 uses the extracted training dataset and the designated hyperparameter value to build a model. The learning unit 125 uses the extracted testing dataset and the built model to measure prediction performance of the model. In addition, the learning unit 125 measures runtime (e.g., in seconds) taken for the model building and the prediction performance measurement. The learning unit 125 outputs the built model, the measured prediction performance, and the measured runtime to the control unit 124.

Each single learning step to be performed by the learning unit 125 forms, for example, a pipeline as illustrated in FIG. 3. A machine learning algorithm used in the model building is designated in a hyperparameter value. Methods for preprocessing the training and testing dataset are also designated in the hyperparameter value. In order to reduce the impact of stochasticity in the extraction of the training and testing datasets, the learning unit 125 may iterate the model building a predetermined number of times (e.g., ten times) in a single learning step. In this case, the learning unit 125 outputs, for example, a model with the best prediction performance amongst the predetermined number of built models, the average prediction performance for the predetermined number of models, and runtime taken for the entire model building iterations.

The existing hyperparameter value selecting unit 126 receives an inquiry from the control unit 124 about a hyperparameter value. The hyperparameter value inquiry includes the latest search history stored in the search history storing unit 122. The existing hyperparameter value selecting unit 126 searches hyperparameter values already tested once or more (existing hyperparameter values) for hyperparameter values for which testing with a sample size increased by one size increment will be allowed. If there is one or more hyperparameter values satisfying the condition, the existing hyperparameter value selecting unit 126 selects one hyperparameter value and notifies the control unit 124 of the selected hyperparameter value. On the other hand, if there is no appropriate hyperparameter value, the existing hyperparameter value selecting unit 126 notifies the control unit 124 of the absence of a selectable hyperparameter value.

In selecting a hyperparameter value, the existing hyperparameter value selecting unit 126 causes the improvement rate estimating unit 127 to estimate the improvement rate of prediction performance for each existing hyperparameter value. A hyperparameter value yielding a higher improvement rate of prediction performance is worth being tested earlier. The improvement rate of prediction performance will be described later. With reference to the resource coefficient table 131 stored in the resource coefficient storing unit 123, the existing hyperparameter value selecting unit 126 determines whether testing a hyperparameter value yielding a high improvement rate of prediction performance with a sample size increased by one size increment meets the above-mentioned resource constraint. If it satisfies the resource constraint, the existing hyperparameter value selecting unit 126 selects this hyperparameter value and notifies the control unit 124 of the selected hyperparameter value.

In response to an inquiry from the existing hyperparameter value selecting unit 126, the improvement rate estimating unit 127 calculates the improvement rate of prediction performance for each existing hyperparameter value. The inquiry has the latest search history attached thereto. The improvement rate of prediction performance of an existing hyperparameter value is, for example, a prediction performance improvement per unit runtime that would be obtained if the existing hyperparameter value is tested with a sample size increased by one size increment (the smallest amongst untested sample sizes). The improvement rate of prediction performance is calculated by dividing an estimated prediction performance improvement (to be described below) by an estimated runtime.

The runtime for testing an existing hyperparameter value with the next sample size may be estimated from an actual runtime measured for the existing hyperparameter value tested with a different sample size. For example, the improvement rate estimating unit 127 calculates the following estimation equation representing the relationship between the sample size s and runtime t: $t=\beta_1+\alpha_1 \times s$, where $\alpha_1$ and $\beta_1$ are coefficients obtained by a linear regression analysis. The improvement rate estimating unit 127 substitutes the next sample size into this estimation equation to obtain an estimated runtime.

The prediction performance improvement of an existing hyperparameter value is calculated by subtracting achieved prediction performance from prediction performance estimated to be obtained when testing the existing hyperparameter value with the next sample size. Note however that, if the subtraction result is negative, the prediction performance improvement is considered to be 0. The achieved prediction performance is the best result amongst prediction performance results obtained for all hyperparameter values and all sample sizes tested up to this point. The prediction performance of the existing hyperparameter value with the next sample size may be estimated from actual prediction performance measured for the existing hyperparameter value tested with a different sample size. For example, the improvement rate estimating unit 127 calculates the following estimation equation representing the relationship between the sample size s and prediction performance f: $f=\beta_2-\alpha_2 \times s^{-\gamma_2}$, where $\alpha_2$, $\beta_2$, and $\gamma_2$ are coefficients obtained by a non-linear regression analysis.

The improvement rate estimating unit 127 substitutes the next sample size into this estimation equation to obtain expected prediction performance. Note here that the estimated prediction performance used in calculating the prediction performance improvement is preferably greater than this expected prediction performance on the grounds that actual prediction performance may deviate above the expected prediction performance. This is intended to reduce the risk of overlooking a hyperparameter value yielding actual prediction performance higher than estimated. Toward this end, for example, an upper confidence bound (UCB) of the 95% confidence interval may be adopted as the estimated prediction performance. The 95% confidence interval incorporates dispersion of measured prediction performance, and indicates that prediction performance to be measured from this time is predicted to fall within the interval with a probability of 95%. The 95% confidence interval is calculated at the same time when the above estimation equation is calculated by a non-linear regression analysis.

Note however that the improvement rate estimating unit 127 may calculate, in place of the UCB, the probability that the prediction performance will exceed the achieved prediction performance (the probability of improvement, or PI) by computing the integral of the distribution of the estimated prediction performance. Alternatively, the improvement rate estimating unit 127 may calculate an expected value of improvement (expected improvement, or EI) where the prediction performance will exceed the achieved prediction performance by computing the integral of the distribution of the estimated prediction performance.

The new hyperparameter value selecting unit 128 receives an inquiry from the control unit 124 about a hyperparameter value. The hyperparameter value inquiry includes the latest search history stored in the search history storing unit 122. The inquiry from the control unit 124 to the new hyperparameter value selecting unit 128 is made when no appropriate existing hyperparameter value has been selected by the existing hyperparameter value selecting unit 126. The new hyperparameter value selecting unit 128 selects one hyperparameter value untested as yet (new hyperparameter value) and notifies the control unit 124 of the new hyperparameter value.

The selection of a new hyperparameter value may be made in many different ways. One way to do this is to select one hyperparameter value at random from the hyperparameter space. Another way is, for example, to select one hyperparameter value amongst hyperparameter values located at a certain distance from neighboring existing hyperparameter values such that existing hyperparameter values are laid out in a grid over the hyperparameter space. Yet another way is to narrow the selection range of hyperparameter values by means of the property that models built with similar continuous hyperparameter element values provide close prediction performance.

FIG. 9 illustrates an example of a search history table.

A search history table 132 is stored in the search history storing unit 122. The search history table 132 includes the following items: hyperparameter value; sample size; prediction performance; and runtime. Each field under the item "hyperparameter value" contains a tested hyperparameter value. Each field under the item "sample size" contains a tested sample size. Each field under the item "prediction performance" contains an actual prediction performance value associated with a pair of its corresponding hyperparameter value and sample size. Each field under the item "runtime" contains an actual runtime value associated with a pair of its corresponding hyperparameter value and sample size.

Next described is a processing procedure of the machine learning apparatus 100.

Figure 10:
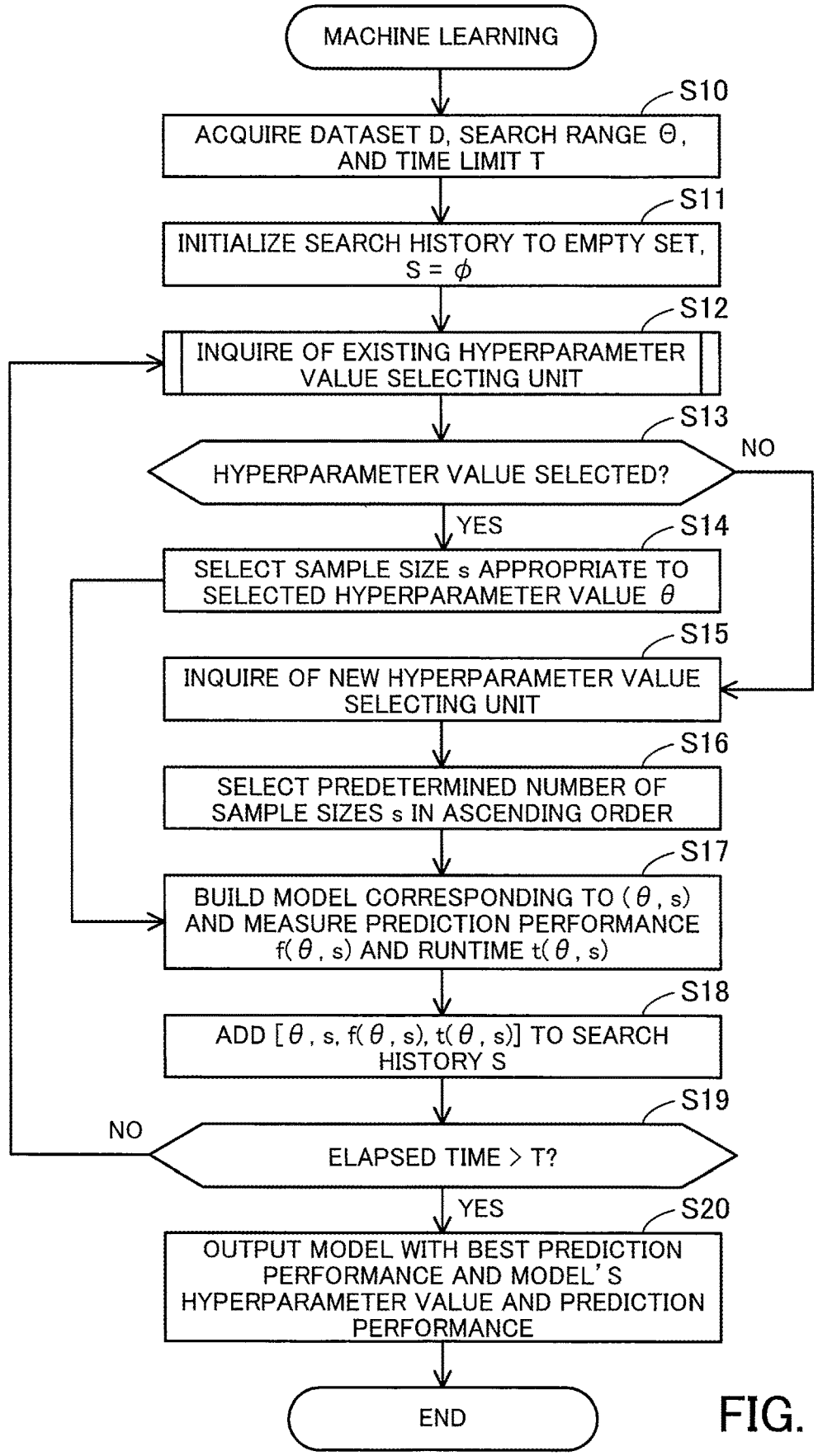
FIG. 10 is a flowchart illustrating an example of a machine learning procedure.

FIG. 10 is a flowchart illustrating an example of a machine learning procedure.

(Step S10) The control unit 124 acquires a dataset D, a search range θ, and a time limit T.

(Step S11) The control unit 124 initializes a search history S to an empty set φ, i.e., S=φ. As a result, all records are deleted from the search history table 132.

(Step S12) The control unit 124 inquires of the existing hyperparameter value selecting unit 126 about a hyperparameter value. At this time, the control unit 124 passes the search history S on to the existing hyperparameter value selecting unit 126. A processing procedure of the existing hyperparameter value selecting unit 126 is described later.

(Step S13) The control unit 124 determines whether a hyperparameter value was selected by the existing hyperparameter value selecting unit 126 in step S12, that is, whether there is an existing hyperparameter value for which testing with a sample size increased by one size increment will be allowed. If such a hyperparameter value has been selected, the process moves to step S14. If not, the process moves to step S15.

(Step S14) The control unit 124 searches the search history S for a record including the hyperparameter value θ selected by the existing hyperparameter value selecting unit 126, and determines the largest amongst tested sample sizes. The control unit 124 selects a sample size s larger than the determined largest sample size by one size increment. Then, the process moves to step S17.

(Step S15) The control unit 124 inquires of the new hyperparameter value selecting unit 128 about a hyperparameter value. At this time, the control unit 124 passes the search history S on to the new hyperparameter value selecting unit 128. The new hyperparameter value selecting unit 128 selects, from the search range $\Theta$, one new hyperparameter value not included in the search history S.

(Step S16) The control unit 124 selects a predetermined number of sample sizes s in ascending order. In the case where a warm-up period is not set, a single smallest sample size is selected as the sample size s. In the case where a warm-up period is provided, successive two or more sample sizes (e.g., four sample sizes) in ascending order are selected as the sample sizes s.

(Step S17) The control unit 124 designates the hyperparameter value $\theta$ and the sample size/sizes s to the learning unit 125. The hyperparameter value $\theta$ is one selected by the existing hyperparameter value selecting unit 126 or the new hyperparameter value selecting unit 128. The sample size/sizes s are that/those selected by the control unit 124 in step S14 or S16.

The learning unit 125 builds a model corresponding to a pair of the designated hyperparameter value and sample size ($\theta$, s), and measures prediction performance f($\theta$, s) of the built model. The learning unit 125 also measures runtime t($\theta$, s). At this time, the learning unit 125 extracts, from the dataset D, a training dataset of the sample size s and a testing dataset which does not share any records with the training dataset. The learning unit 125 builds a model using the training dataset and the hyperparameter value $\theta$. The hyperparameter value $\theta$ may designate preprocessing methods and a machine learning algorithm. The learning unit 125 uses the built model and the testing dataset to measure the prediction performance f($\theta$, s). The runtime t($\theta$, s) is the total time spent for the data extraction, model building, and prediction performance evaluation.

(Step S18) The control unit 124 adds, to the search history S, a record including the hyperparameter value $\theta$, the sample size s, the prediction performance f($\theta$, s), and the runtime t($\theta$, s).

(Step S19) The control unit 124 checks the time elapsed since the start of the machine learning process and determines whether the elapsed time has exceeded the time limit T. If the elapsed time has exceeded the time limit T, the process moves to step S20. If not, the process moves to step S12.

(Step S20) The control unit 124 selects a model with the best prediction performance amongst all models built in step S17. The control unit 124 also extracts, from the search history S, a hyperparameter value used to build the selected model and prediction performance of the model. The control unit 124 then outputs the selected model, the hyperparameter value, and the prediction performance.

Figure 11:
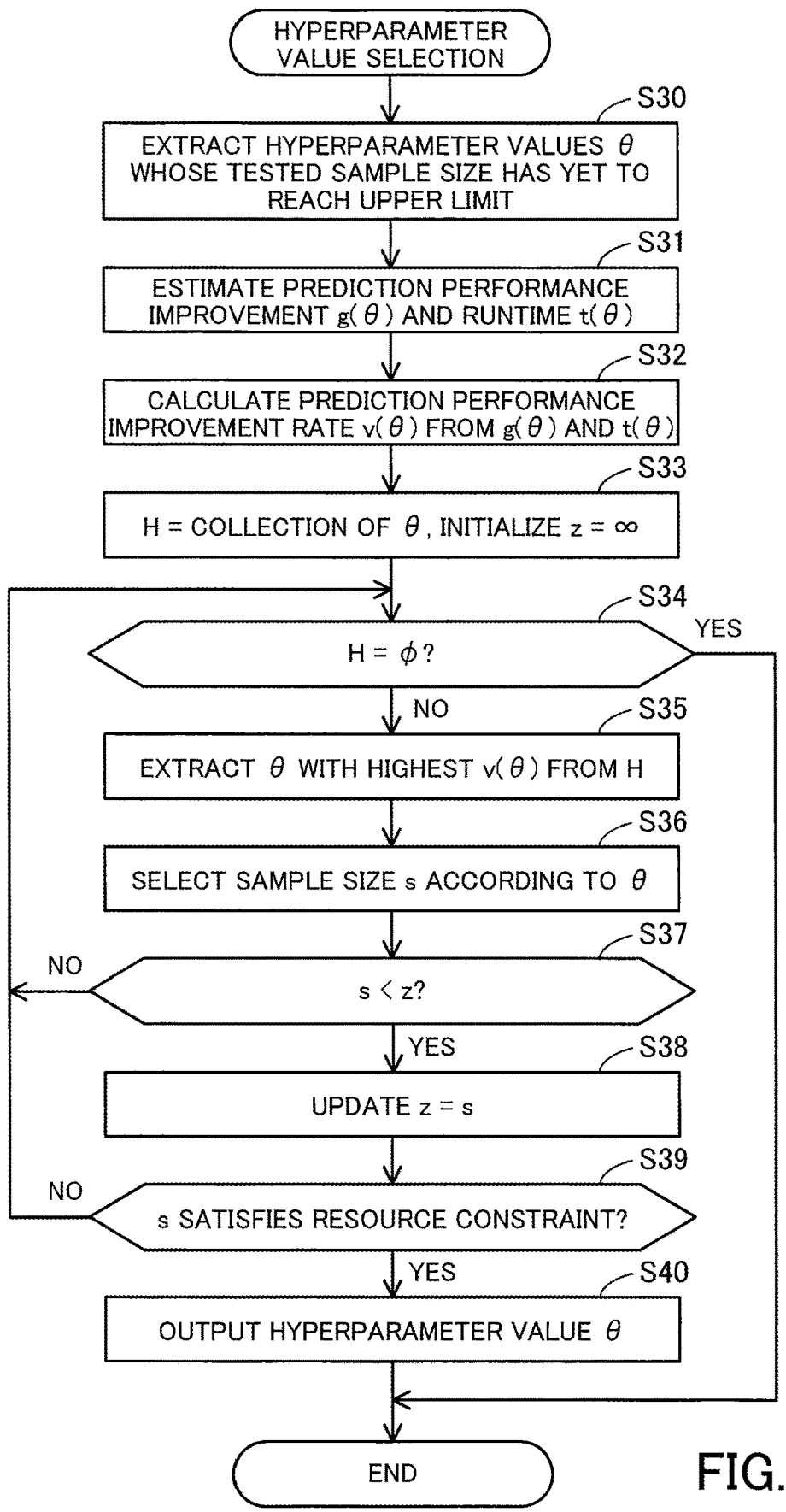
FIG. 11 is a flowchart illustrating an example of a hyperparameter value selection procedure.

FIG. 11 is a flowchart illustrating an example of a hyperparameter value selection procedure.

The hyperparameter value selection is performed in step S12 above.

(Step S30) With reference to the search history S, the existing hyperparameter value selecting unit 126 determines the largest sample size tested for each hyperparameter value. The existing hyperparameter value selecting unit 126 extracts, from the search history S, hyperparameter values $\theta$ whose largest tested sample size has yet to reach a sample size upper limit, i.e., hyperparameter values $\theta$ for which the sample size is allowed to increase by one size increment.

(Step S31) With respect to each of the hyperparameter values $\theta$ extracted in step S30, the improvement rate estimating unit 127 estimates a prediction performance improvement g($\theta$) and a runtime t($\theta$). The prediction performance improvement g($\theta$) represents the difference between current achieved prediction performance and prediction performance estimated to be obtained with a sample size increased by one size increment. The runtime t($\theta$) is a runtime estimated to be spent for testing with the sample size increased by one size increment. The improvement rate estimating unit 127 extracts actual prediction performance associated with the hyperparameter value $\theta$ from the search history S and performs a non-linear regression analysis using the extracted actual prediction performance, to thereby calculate the estimated prediction performance, which is used in calculating the prediction performance improvement g($\theta$). In addition, the improvement rate estimating unit 127 extracts an actual runtime associated with the hyperparameter value $\theta$ from the search history S and performs a linear regression analysis using the extracted actual runtime, to thereby calculate the runtime t($\theta$).

(Step S32) With respect to each of the hyperparameter values $\theta$ extracted in step S30, the improvement rate estimating unit 127 calculates a prediction performance improvement rate v($\theta$). The prediction performance improvement rate v($\theta$) is obtained by dividing the prediction performance improvement g($\theta$) by the runtime t($\theta$).

(Step S33) The existing hyperparameter value selecting unit 126 identifies a set H as a collection of the hyperparameter values $\theta$ extracted in step S30, and initializes a sample size z to infinity $\infty$ (z=$\infty$).

(Step S34) The existing hyperparameter value selecting unit 126 determines whether the set H is an empty set (H=$\varphi$). If the set H is an empty set, the improvement rate estimating unit 127 determines that there is no hyperparameter value to be selected, and thus the hyperparameter value selection process ends. If the set H is not an empty set, the process moves to step S35.

(Step S35) The existing hyperparameter value selecting unit 126 extracts and deletes, from the set H, a hyperparameter value $\theta$ with the highest prediction performance improvement rate v($\theta$) calculated in step S32.

(Step S36) The existing hyperparameter value selecting unit 126 searches the search history S for a record including the hyperparameter value $\theta$ extracted in step S35 and determines the largest sample size tested for the hyperparameter value $\theta$. The existing hyperparameter value selecting unit 126 selects a sample size s that is larger than the determined largest sample size by one size increment.

(Step S37) The existing hyperparameter value selecting unit 126 determines whether the sample size s selected in step S36 is smaller than the sample size z. If s<z, the process moves to step S38. If s≥z, the process moves to step S34.

(Step S38) The existing hyperparameter value selecting unit 126 updates z with s (z=s).

(Step S39) The existing hyperparameter value selecting unit 126 determines whether the sample size s satisfies the resource constraint with reference to the search history S. How to determine whether the sample size s satisfies the resource constraint is described later. If the sample size s satisfies the resource constraint, the process moves to step S40. If not, the process moves to step S34.

(Step S40) The existing hyperparameter value selecting unit 126 selects a hyperparameter value θ extracted in step S35 at the end and outputs it to the control unit 124.

Note here that there is a possibility that a hyperparameter value $θ_{m1}$ with the highest prediction performance improvement rate would not be selected as a result of the resource constraint having failed to be satisfied. In that case, if a hyperparameter value $θ_{m2}$ with the second-highest prediction performance improvement rate is about to be tested with a sample size equal to or larger than that for the hyperparameter value $θ_{m1}$, step S37 above prevents the hyperparameter value $θ_{m2}$ from being selected. This is because, if the hyperparameter value $θ_{m2}$ is tested first, testing of the hyperparameter value $θ_{m1}$ (having the highest prediction performance improvement rate) with this sample size may be delayed due to the resource constraint. According to the flowchart in FIG. 11, a hyperparameter value with higher prediction performance improvement rate is selected as preferentially as possible.

Figure 12:
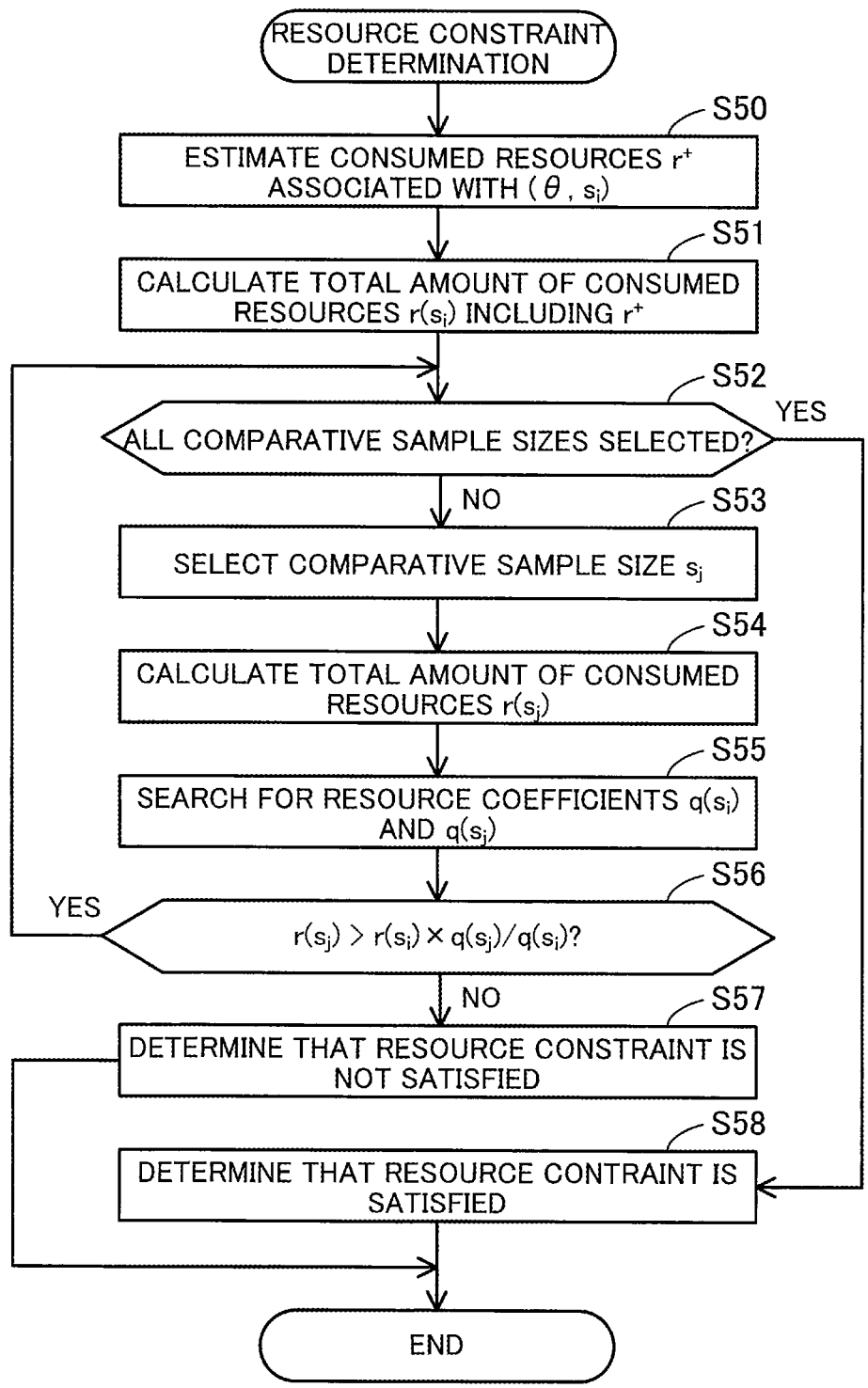
FIG. 12 is a flowchart illustrating an example of a resource constraint determination procedure.

FIG. 12 is a flowchart illustrating an example of a resource constraint determination procedure.

The resource constraint determination is performed in step S39 above.

(Step S50) The existing hyperparameter value selecting unit 126 estimates consumed resources $r^+$ of a learning step using a pair (θ, $s_i$) of a hyperparameter value θ and a sample size $s_1$. The hyperparameter value θ here is the one extracted in step S35 above. The sample size $s_1$ is the one selected in step S36 above, which is a target sample size.

If the sample size is used as an indicator of resources, the consumed resources $r^+$ are the sample size $s_i$. If the runtime is used as an indicator of resources, the consumed resources $r^+$ are a runtime t (θ, $s_i$). The runtime t(θ, $s_i$) is estimated in step S31 above. If the number of iterations is used as an indicator of resources, the consumed resources $r^+$ are the number of planned iterations. Note that in the case where the number of iterations is used as the resource indicator, the horizontal axis of the rising contour of the prediction performance is the number of iterations in place of the sample size. Therefore, the number of iterations as the consumed resources $r^+$ is identified in a manner similar to that used for the sample size.

(Step S51) The existing hyperparameter value selecting unit 126 searches the search history S for records including the sample size $s_i$, and then adds together already consumed resources for the sample size $s_i$. When the sample size is used as an indicator of resources, the total of already consumed resources is calculated as the sample size $s_i$ multiplied by the number of records. When the runtime is used as an indicator of resources, the total of already consumed resources is the sum of actual runtimes included in the found records. When the number of iterations is used as an indicator of resources, the total of already consumed resources is calculated as the number of iterations corresponding to the sample size $s_i$ multiplied by the number of records. The existing hyperparameter value selecting unit 126 adds the consumed resources $r^+$ obtained in step S50 to the total of already consumed resources, to thereby calculate the total amount of consumed resources $r(s_i)$.

(Step S52) The existing hyperparameter value selecting unit 126 determines whether to have selected all comparative sample sizes smaller than the sample size $s_i$. For example, the comparative sample sizes are all the sample sizes smaller than the sample size $s_i$. Alternatively, the comparative sample sizes may be composed of only a sample size smaller than the sample size $s_i$ by one size increment. Yet alternatively, the comparative sample sizes may be composed of only comparatively small predetermined sample sizes. Yet alternatively, the comparative sample sizes may be composed of sample sizes ranging from the one obtained at the end of the warm-up period to the one smaller than the sample size $s_i$ by one size increment. The criterion for the comparative sample sizes may be designated in advance by the user. If all the comparative sample sizes have been selected, the process moves to step S58. If any pending comparative sample size remains, the process moves to step S53.

(Step S53) The existing hyperparameter value selecting unit 126 selects one comparative sample size (sample size $s_j$).

(Step S54) The existing hyperparameter value selecting unit 126 searches the search history S for records including the sample size $s_j$, and calculates the total amount of consumed resources $r(s_j)$ by adding together already consumed resources for the sample size $s_j$. When the sample size is used as an indicator of resources, $r(s_j)$ is calculated as the sample size $s_j$ multiplied by the number of records. When the runtime is used as an indicator of resources, $r(s_j)$ is the sum of actual runtimes included in the found records. When the number of iterations is used as an indicator of resources, $r(s_j)$ is calculated as the number of iterations corresponding to the sample size $s_j$ multiplied by the number of records.

Note that it is sometimes the case in machine learning that a pair of the same hyperparameter value and sample size undergoes a plurality of learning steps for the purpose of improving the accuracy of the rising contour of the prediction performance. In that case, resources used to calculate each of the total amounts of consumed resources $r(s_i)$ and $r(s_j)$ may be the sum or average of resources consumed during the learning steps.

(Step S55) The existing hyperparameter value selecting unit 126 searches the resource coefficient table 131 for the resource coefficient $q(s_i)$ corresponding to the sample size $s_i$ and the resource coefficient $q(s_j)$ corresponding to the sample size $s_j$.

(Step S56) The existing hyperparameter value selecting unit 126 calculates a threshold according to the sample size $s_i$ as $r(s_i) \times q(s)/q(s_i)$. The existing hyperparameter value selecting unit 126 compares the total amount of consumed resources $r(s_j)$ with the threshold to determine whether $r(s_j)$ is greater than the threshold. If $r(s_j)$ is greater than the threshold, the process moves to step S52. If $r(s_j)$ is equal to or less than the threshold, the process moves to step S57.

(Step S57) The existing hyperparameter value selecting unit 126 determines that the resource constraint is not satisfied. As for at least one comparative sample size, if the total amount of consumed resources is equal to or less than the threshold according to the target sample size, it is determined that the resource constraint is not satisfied.

(Step S58) The existing hyperparameter value selecting unit 126 determines that the resource constraint is satisfied. As for each of all the comparative sample sizes, if the total amount of consumed resources exceeds the threshold according to the target sample size, it is determined that the resource constraint is satisfied.

According to the machine learning apparatus 100 of the second embodiment, an appropriate hyperparameter value is automatically found for a designated dataset. This eliminates the need for the user to manually tune a hyperparameter value and facilitates building a model with high prediction performance. In addition, the machine learning apparatus 100 expands, with respect to each hyperparameter value, the sample size of a training dataset in stages during which the rising contour of the prediction performance is estimated.

This enables determination of whether the hyperparameter value has a high upper limit on prediction performance in a shorter amount of time compared to the case of starting out with a large sample size. Thus, it is possible to terminate, at an early point in time, testing of hyperparameter values with low upper limits of prediction performance.

Further, the machine learning apparatus 100 estimates, with respect to each hyperparameter value, the prediction performance improvement rate in the case of testing the hyperparameter value with a sample size increased by one size increment, and preferentially selects a hyperparameter value with a higher prediction performance improvement rate. This delivers the fastest possible improvement in the prediction performance of each model and thus provides an efficient hyperparameter search under time pressure. Still further, the machine learning apparatus 100 achieves an efficient search for a hyperparameter value with high prediction performance even when a plurality of categorical hyperparameter elements is included in each hyperparameter and, for this reason, the assumption that models built with similar hyperparameter values provide close prediction performance does not hold.

Yet further, the machine learning apparatus 100 controls the sequence of testing hyperparameter values such that the total amounts of consumed resources of smaller sample sizes and those of larger sample sizes are maintained at a predetermined ratio. Therefore, it is possible to incorporate a fine balance between increasing the number of tested hyperparameter values and expanding the sample size. This, in turn, reduces the risk of failing to narrow hyperparameter values due to giving too much priority to testing with small sample sizes, as well as the risk of running fruitless testing due to giving too much priority to testing with large sample sizes.

(c) Third Embodiment

This part explains a third embodiment. While omitting repeated explanations, the following description focuses on differences from the second embodiment above.

According to the second embodiment, even though the prediction performance of an existing hyperparameter value has come close to its upper limit and the prediction performance improvement rate has therefore been sufficiently reduced, the existing hyperparameter value may be still selected. In view of this, the third embodiment is directed to terminating testing of each existing hyperparameter value whose prediction performance improvement rate has fallen below a threshold.

A machine learning apparatus according to the third embodiment may be implemented using the same configuration as the machine learning apparatus 100 of the second embodiment illustrated in FIGS. 2 and 7 to 9. The third embodiment is described below using the same reference numerals as those in FIGS. 2 and 7 to 9.

The overall machine learning procedure of the third embodiment is the same as that used in the second embodiment illustrated in FIG. 10. The following describes a hyperparameter value selection procedure according to the third embodiment in distinction from the corresponding procedure of the second embodiment illustrated in FIG. 11, and then a resource constraint determination procedure according to the third embodiment in distinction from the corresponding procedure of the second embodiment illustrated in FIG. 12.

Figure 13:
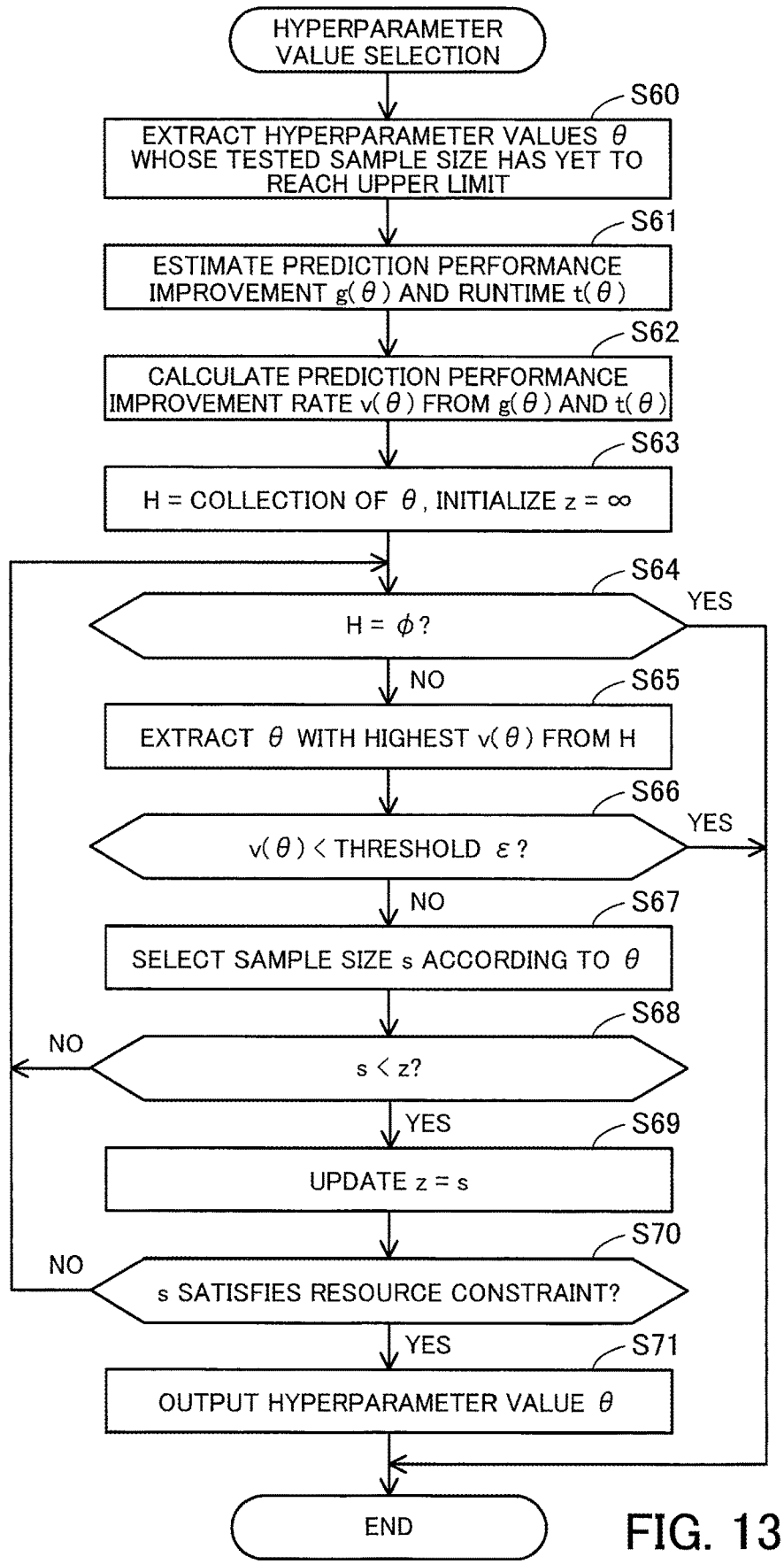
FIG. 13 is a flowchart illustrating another example of the hyperparameter value selection procedure.

FIG. 13 is a flowchart illustrating another example of the hyperparameter value selection procedure.

(Step S60) With reference to the search history S, the existing hyperparameter value selecting unit 126 determines the largest sample size tested for each hyperparameter value. The existing hyperparameter value selecting unit 126 extracts, from the search history S, hyperparameter values θ whose largest tested sample size has yet to reach a sample size upper limit.

(Step S61) With respect to each of the hyperparameter values θ extracted in step S60, the improvement rate estimating unit 127 estimates the prediction performance improvement g(θ) and the runtime t(θ).

(Step S62) With respect to each of the hyperparameter values θ extracted in step S60, the improvement rate estimating unit 127 calculates the prediction performance improvement rate v(θ).

(Step S63) The existing hyperparameter value selecting unit 126 identifies the set H as a collection of the hyperparameter values θ extracted in step S60, and initializes the sample size z to infinity ∞ (z=∞).

(Step S64) The existing hyperparameter value selecting unit 126 determines whether the set H is an empty set (H=φ). If the set H is an empty set, the improvement rate estimating unit 127 determines that there is no hyperparameter value to be selected, and thus the hyperparameter value selection process ends. If the set H is not an empty set, the process moves to step S65.

(Step S65) The existing hyperparameter value selecting unit 126 extracts and deletes, from the set H, a hyperparameter value θ with the highest prediction performance improvement rate v(θ) calculated in step S62.

(Step S66) The existing hyperparameter value selecting unit 126 compares the prediction performance improvement rate v(θ) of the hyperparameter value θ extracted in step S65 with a threshold ε. The threshold ε may be a fixed value assigned in advance or a value designated by the user at the start of machine learning. Suppose, for example, that the threshold ε=0.001/3600. This represents the rate at which the prediction performance increases by 0.001 per hour. The existing hyperparameter value selecting unit 126 determines whether the prediction performance improvement rate v(θ) is less than the threshold ε. If v(θ) is less than the threshold ε, the improvement rate estimating unit 127 determines that there is no hyperparameter value to be selected, and thus the hyperparameter value selection process ends. If v(θ) is equal to or greater than the threshold ε, the process moves to step S67.

(Step S67) The existing hyperparameter value selecting unit 126 searches the search history S for a record including the hyperparameter value θ extracted in step S65 and determines the largest sample size tested for the hyperparameter value θ. The existing hyperparameter value selecting unit 126 selects a sample size s that is larger than the determined largest sample size by one size increment.

(Step S68) The existing hyperparameter value selecting unit 126 determines whether the sample size s selected in step S67 is smaller than the sample size z. If s<z, the process moves to step S69. If s≥z, the process moves to step S64.

(Step S69) The existing hyperparameter value selecting unit 126 updates z with s (z=s).

(Step S70) The existing hyperparameter value selecting unit 126 determines whether the sample size s satisfies the resource constraint with reference to the search history S. How to determine whether the sample size s satisfies the resource constraint is described later. If the sample size s satisfies the resource constraint, the process moves to step S71. If not, the process moves to step S64.

(Step S71) The existing hyperparameter value selecting unit 126 selects a hyperparameter value θ extracted in step S65 at the end and outputs it to the control unit 124.

Figure 14:
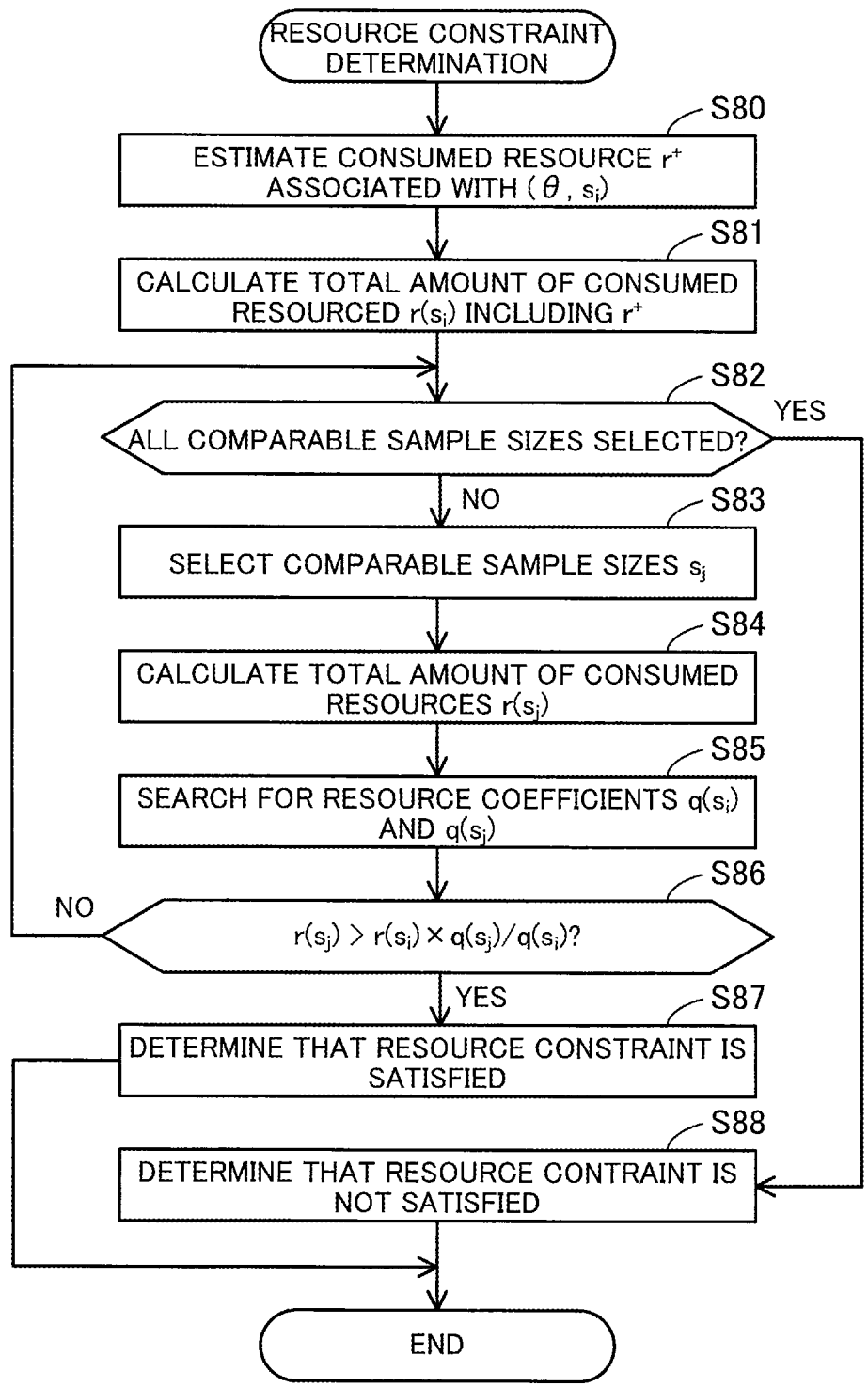
FIG. 14 is a flowchart illustrating another example of the resource constraint determination procedure.

FIG. 14 is a flowchart illustrating another example of the resource constraint determination procedure.

(Step S80) The existing hyperparameter value selecting unit 126 estimates consumed resources $r^+$ of a learning step using a pair (θ, $s_i$) of a hyperparameter value θ and a sample size $s_i$. The hyperparameter value e is the one extracted in step S65 above. The sample size $s_i$ is the one selected in step S67 above, which is a target sample size.

(Step S81) The existing hyperparameter value selecting unit 126 searches the search history S for records including the sample size $s_i$, and then adds together already consumed resources for the sample size $s_i$. The existing hyperparameter value selecting unit 126 adds the consumed resources $r^+$ obtained in step S80 to the total of already consumed resources, to thereby calculate the total amount of consumed resources $r(s_i)$.

(Step S82) The existing hyperparameter value selecting unit 126 determines whether to have selected all comparable sample sizes smaller than the sample size $s_i$. For example, the comparable sample sizes are all the sample sizes smaller than the sample size $s_i$. If all the comparable sample sizes have been selected, the process moves to step S88. If any pending comparable sample size remains, the process moves to step S83.

(Step S83) The existing hyperparameter value selecting unit 126 selects one comparable sample size (sample size $s_j$). It is assumed that the comparable sample size selected here is sufficiently small. For example, the selected comparable sample size may be, for example, the smallest sample size, the $n^{th}$ sample size ("n" is a predetermined number) in ascending order, or a sample size obtained at the end of the warm-up period.

(Step S84) The existing hyperparameter value selecting unit 126 searches the search history S for records including the sample size $s_j$, and calculates the total amount of consumed resources $r(s_j)$ by adding together already consumed resources for the sample size $s_j$.

(Step S85) The existing hyperparameter value selecting unit 126 searches the resource coefficient table 131 for the resource coefficient $q(s_i)$ corresponding to the sample size $s_i$ and the resource coefficient $q(s_j)$ corresponding to the sample size $s_j$.

(Step S86) The existing hyperparameter value selecting unit 126 calculates a threshold according to the sample size $s_i$ as $r(s_i) \times q(s_j)/q(s_i)$. The existing hyperparameter value selecting unit 126 compares the total amount of consumed resources $r(s_j)$ with the threshold to determine whether $r(s_j)$ is greater than the threshold. If $r(s_j)$ is greater than the threshold, the process moves to step S87. If $r(s_j)$ is equal to or less than the threshold, the process moves to step S82.

(Step S87) The existing hyperparameter value selecting unit 126 determines that the resource constraint is satisfied. As for at least one comparable sample size, if the total amount of consumed resources is greater than the threshold according to the target sample size, it is determined that the resource constraint is satisfied.

(Step S88) The existing hyperparameter value selecting unit 126 determines that the resource constraint is not satisfied. As for each of all the comparable sample sizes, if the total amount of consumed resources is equal to or less than the threshold according to the target sample size, it is determined that the resource constraint is not satisfied.

As seen above, according to the third embodiment, the resource constraint is determined to be satisfied if the total amount of consumed resources associated with at least one comparable sample size exceeds the threshold. This is because, if the expansion of the sample size is terminated halfway for a plurality of hyperparameter values, the total amount of consumed resources associated with an intermediate sample size may become insufficient and fail to exceed a threshold corresponding to the follow-up sample size. In view of this, the third embodiment places emphasis on the ratio between the total amount of consumed resources associated with each early-stage sample size and that associated with its target sample size.

The machine learning apparatus of the third embodiment achieves the same effect as the second embodiment. Further, the machine learning apparatus of the third embodiment terminates halfway through testing of hyperparameter values whose prediction performance improvement rate has been sufficiently reduced. This makes a hyperparameter search more efficient.

According to one aspect, it is possible to provide a more efficient search for a hyperparameter value.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning method comprising:
    causing, by a processor, a first machine learning process and a second machine learning process to be executed, the first machine learning process generating a machine learning model by using a training dataset of a first sample size and a first hyperparameter value, the second machine learning process generating a machine learning model by using a training dataset of the first sample size and a second hyperparameter value;
    calculating, by the processor, total resources associated with the first sample size based on resources used by the first machine learning process and resources used by the second machine learning process when a third machine learning process has not yet been executed, the third machine learning process using a training dataset of a second sample size, which is larger than the first sample size, and the first hyperparameter value;
    calculating, by the processor, a threshold by multiplying an estimated amount of resources to be used in the second sample size by q1/q2, wherein the q1 indicates a first resource coefficient corresponding to the first sample size, the q2 indicates a second resource coefficient corresponding to the second sample size, and the q2 is greater than the q1;
    generating, by the processor, a machine learning model by executing the third machine learning process to progress when the total resources exceed the threshold; and
    withholding, by the processor, execution of the third machine learning process and generating a machine learning model by executing a fourth machine learning process to progress when the total resources are equal to or less than the threshold, the fourth machine learning process using a training dataset whose size is equal to or less than the first sample size and a third hyperparameter value.

2. The machine learning method according to claim 1, wherein:
each of the first machine learning process, the second machine learning process, the third machine learning process, and the fourth machine learning process is a pipeline including a plurality of unit processes, and
each of the first hyperparameter value, the second hyperparameter value, and the third hyperparameter value includes a plurality of hyperparameter element values indicating a plurality of processing algorithms which are set in association with the plurality of unit processes.

3. The machine learning method according to claim 1, further comprising:
determining, by the processor, priority of each of a plurality of unexecuted machine learning processes, which are to generate individual machine learning models using different hyperparameter values, based on estimated prediction performance of the individual machine learning models to be generated, the plurality of unexecuted machine learning processes including the third machine learning process; and
withholding, by the processor, execution of an unexecuted machine learning process which is to generate a machine learning model by using a training dataset whose size is equal to or larger than the second sample size when the third machine learning process has highest priority amongst the plurality of unexecuted machine learning processes and the execution of the third machine learning process is withheld.

4. The machine learning method according to claim 1, wherein:
the calculating of the total resources includes calculating, when the first sample size is provided in plurality, the total resources associated with each of the first sample sizes,
the third machine learning process is executed when the total resources associated with the each of the first sample sizes exceed the threshold, and
the withholding includes withholding the execution of the third machine learning process when the total resources associated with at least one of the first sample sizes are equal to or less than the threshold.

5. The machine learning method according to claim 1, wherein:
the calculating of the total resources includes calculating, when the first sample size is provided in plurality, the total resources associated with each of the first sample sizes,
the third machine learning process is executed when the total resources associated with at least one of the first sample sizes exceed the threshold, and
the withholding includes withholding the execution of the third machine learning process when the total resources associated with the each of the first sample sizes are equal to or less than the threshold.

6. A machine learning apparatus comprising:
a memory configured to store a search history indicating a history of machine learning processes, each of which uses a training dataset of one sample size and one hyperparameter value; and
a processor configured to execute a process including:
detecting, from the search history, that a first machine learning process using a training dataset of a first sample size and a first hyperparameter value has been executed, a second machine learning process using a training dataset of the first sample size and a second hyperparameter value has been executed, and a third machine learning process using a training dataset of a second sample size, which is larger than the first sample size, and the first hyperparameter value has not yet been executed,
calculating total resources associated with the first sample size based on resources used by the first machine learning process and resources used by the second machine learning process,
calculating a threshold by multiplying an estimated amount of resources to be used in the second sample size by q1/q2, wherein the q1 indicates a first resource coefficient corresponding to the first sample size, the q2 indicates a second resource coefficient corresponding to the second sample size, and the q2 is greater than the q1;
generating a machine learning model by executing the third machine learning process to progress when the total resources exceed the threshold, and
withholding execution of the third machine learning process and generating a machine learning model by executing a fourth machine learning process to progress when the total resources are equal to or less than the threshold, the fourth machine learning process using a training dataset whose size is equal to or less than the first sample size and a third hyperparameter value.

7. A non-transitory computer-readable storage medium storing a computer program that causes a computer to execute a machine learning process comprising:
causing a first machine learning process and a second machine learning process to be executed, the first machine learning process generating a machine learning model by using a training dataset of a first sample size and a first hyperparameter value, the second machine learning process generating a machine learning model by using a training dataset of the first sample size and a second hyperparameter value;
calculating total resources associated with the first sample size based on resources used by the first machine learning process and resources used by the second machine learning process when a third machine learning process has not yet been executed, the third machine learning process using a training dataset of a second sample size, which is larger than the first sample size, and the first hyperparameter value;
calculating a threshold by multiplying an estimated amount of resources to be used in the second sample size by q1/q2, wherein the q1 indicates a first resource coefficient corresponding to the first sample size, the q2 indicates a second resource coefficient corresponding to the second sample size, and the q2 is greater than the q1;
generating a machine learning model by executing the third machine learning process to progress when the total resources exceed a threshold; and
withholding execution of the third machine learning process and generating a machine learning model by executing a fourth machine learning process to progress when the total resources are equal to or less than the threshold, the fourth machine learning process using a training dataset whose size is equal to or less than the first sample size and a third hyperparameter value.

* * * * *